US012351527B2

United States Patent
Sant et al.

(10) Patent No.: US 12,351,527 B2
(45) Date of Patent: Jul. 8, 2025

(54) INTEGRATION OF DIRECT AIR CAPTURE SYSTEM INTO CO₂ MINERALIZATION PROCESS OF CONCRETES AND AGGREGATES

(71) Applicants: The Regents of the University of California, Oakland, CA (US); CarbonBuilt, Manhattan Beach, CA (US)

(72) Inventors: Gaurav Sant, Los Angeles, CA (US); Dante Simonetti, Los Angeles, CA (US); Iman Mehdipour, Los Angeles, CA (US); David Jassby, Los Angeles, CA (US); Yenwen Tseng, Los Angeles, CA (US)

(73) Assignees: The Regents of the University of California, Oakland, CA (US); CarbonBuilt, Manhattan Beach, CA (US)

( * ) Notice: Subject to any disclaimer, the term of this patent is extended or adjusted under 35 U.S.C. 154(b) by 0 days.

(21) Appl. No.: 18/047,633

(22) Filed: Oct. 18, 2022

(65) Prior Publication Data

US 2023/0120088 A1   Apr. 20, 2023

Related U.S. Application Data

(60) Provisional application No. 63/256,856, filed on Oct. 18, 2021.

(51) Int. Cl.
C04B 40/02 (2006.01)
C04B 40/00 (2006.01)
(Continued)

(52) U.S. Cl.
CPC ...... *C04B 40/0231* (2013.01); *C04B 40/0007* (2013.01); *B01D 53/1475* (2013.01); *C04B 2111/00017* (2013.01)

(58) Field of Classification Search
CPC ........... C04B 40/0231; C04B 40/0007; C04B 2111/00017; C04B 14/26; C04B 20/023;
(Continued)

(56) References Cited

U.S. PATENT DOCUMENTS 2,117,348 A   5/1938   Muskat
2,802,719 A   8/1957   Avedikian
(Continued)

FOREIGN PATENT DOCUMENTS

AU   2005290082 B2   3/2011
CN    111760436 A    10/2020
(Continued)

OTHER PUBLICATIONS

Sanz-Pérez et al., "Direct Capture of CO2 from Ambient Air", Chem. Rev., 2016, vol. 116, pp. 11840-11876, 37 pages.
(Continued)

*Primary Examiner* — Stephen Hobson
(74) *Attorney, Agent, or Firm* — SQUIRE PATTON BOGGS (US) LLP

(57) ABSTRACT

A method of forming a concrete product includes directly capturing $CO_2$ from a gas source, the capturing comprising contacting the gas source with an absorption solution having a solvent and a solute, wherein the solvent and/or the solute are capable of reacting with $CO_2$ to form an anionic compound, adjusting the pH of the absorption solution electrochemically to less than about 7 to release the $CO_2$ as a concentrated vapor containing $CO_2$, collecting the concentrated vapor containing $CO_2$, regenerating the solvent and/or the solute, and optionally collecting the regenerated solvent
(Continued)

and/or solute; flowing the concentrated vapor containing $CO_2$ through a gas processing unit to adjust at least one of a temperature, a relative humidity, or a flow rate of the concentrated vapor containing $CO_2$; and contacting the concentrated vapor containing $CO_2$ with a concrete component.

16 Claims, 10 Drawing Sheets

(51) Int. Cl.
    *B01D 53/14* (2006.01)
    *C04B 111/00* (2006.01)

(58) Field of Classification Search
    CPC ............... C04B 28/02; B01D 53/1425; B01D 2257/504; B01D 2258/0283; B01D 2258/06; B01D 53/1475; Y02C 20/40; Y02P 40/18
    See application file for complete search history.

(56) References Cited

U.S. PATENT DOCUMENTS

| | | |
|---|---|---|
| 4,318,996 A | 3/1982 | Magder |
| 4,379,870 A | 4/1983 | Matsumoto |
| 4,391,680 A | 7/1983 | Mani et al. |
| 4,432,666 A | 2/1984 | Frey et al. |
| 4,452,635 A | 6/1984 | Noshi et al. |
| 4,828,620 A | 5/1989 | Mallow et al. |
| 5,435,846 A | 7/1995 | Tatematsu et al. |
| 5,455,013 A * | 10/1995 | Shibata ................... B01J 20/06 106/793 |
| 5,518,540 A | 5/1996 | Jones, Jr. |
| 5,744,078 A | 4/1998 | Soroushian et al. |
| 5,798,328 A | 8/1998 | Kottwitz et al. |
| 5,928,420 A | 7/1999 | Oates et al. |
| 6,264,736 B1 | 7/2001 | Knopf et al. |
| 6,569,923 B1 | 5/2003 | Slagter |
| 7,413,014 B2 | 8/2008 | Chatterji et al. |
| 7,879,305 B2 | 2/2011 | Reddy et al. |
| 8,021,477 B2 | 9/2011 | Brown et al. |
| 8,088,292 B2 | 1/2012 | Neumann et al. |
| 8,163,066 B2 | 4/2012 | Eisenberger |
| 8,252,242 B2 | 8/2012 | Vandor |
| 8,262,777 B2 | 9/2012 | Neumann et al. |
| 8,333,944 B2 | 12/2012 | Constantz et al. |
| 8,383,072 B2 | 2/2013 | Smedley et al. |
| 8,507,228 B2 | 8/2013 | Simpson et al. |
| 8,852,319 B2 | 10/2014 | Wijmans et al. |
| 8,864,876 B2 | 10/2014 | Neumann et al. |
| 8,894,747 B2 | 11/2014 | Eisenberger et al. |
| 9,061,237 B2 | 6/2015 | Eisenberger et al. |
| 9,163,297 B2 | 10/2015 | Langley |
| 9,205,371 B2 | 12/2015 | Cooper et al. |
| 9,221,027 B2 | 12/2015 | Kuppler et al. |
| 9,227,153 B2 | 1/2016 | Eisenberger |
| 9,382,120 B2 | 7/2016 | Dakhil |
| 9,382,157 B2 | 7/2016 | Guzzetta et al. |
| 9,433,886 B2 | 9/2016 | Smedley et al. |
| 9,440,189 B2 | 9/2016 | Mercier et al. |
| 9,469,547 B2 | 10/2016 | Kniesburges |
| 9,475,000 B2 | 10/2016 | Benyahia |
| 9,492,945 B2 * | 11/2016 | Niven .................. C04B 40/0231 |
| 9,555,365 B2 | 1/2017 | Eisenberger et al. |
| 9,714,406 B2 | 7/2017 | Constantz et al. |
| 9,786,940 B2 | 10/2017 | Langley |
| 9,789,439 B2 | 10/2017 | Siller et al. |
| 9,790,131 B2 * | 10/2017 | Lee .......................... B28C 5/468 |
| 9,808,759 B2 | 11/2017 | Balfe et al. |
| 9,861,931 B2 | 1/2018 | Kuopanportti et al. |
| 10,010,829 B2 | 7/2018 | Wright et al. |
| 10,017,739 B2 | 7/2018 | Tedder et al. |
| 10,233,127 B2 | 3/2019 | Atakan |
| 10,351,478 B2 | 7/2019 | Quinn et al. |
| 10,392,305 B2 | 8/2019 | Wang et al. |
| 10,668,443 B2 | 6/2020 | Kuppler et al. |
| 10,781,140 B2 | 9/2020 | Patten et al. |
| 10,968,142 B2 | 4/2021 | Sant et al. |
| 11,040,898 B2 | 6/2021 | Sant et al. |
| 11,230,473 B2 | 1/2022 | Sant et al. |
| 11,339,094 B2 | 5/2022 | Sant et al. |
| 11,384,029 B2 * | 7/2022 | Sant .................... C04B 40/0263 |
| 11,919,775 B2 | 3/2024 | Sant et al. |
| 12,042,765 B2 | 7/2024 | Simonetti et al. |
| 2001/0023655 A1 | 9/2001 | Knopf |
| 2002/0158018 A1 | 10/2002 | Abramowitz et al. |
| 2002/0168473 A1 | 11/2002 | Ottersbach |
| 2004/0077787 A1 | 4/2004 | Karande |
| 2005/0238563 A1 | 10/2005 | Eighmy et al. |
| 2006/0247450 A1 | 11/2006 | Wu et al. |
| 2007/0186821 A1 | 8/2007 | Brown et al. |
| 2008/0004449 A1 | 1/2008 | Yong et al. |
| 2008/0156232 A1 | 7/2008 | Crudden |
| 2008/0245274 A1 | 10/2008 | Ramme |
| 2008/0245672 A1 | 10/2008 | Little et al. |
| 2009/0081096 A1 | 3/2009 | Pellegrin |
| 2009/0169452 A1 | 7/2009 | Constantz et al. |
| 2009/0214408 A1 | 8/2009 | Blake et al. |
| 2010/0083880 A1 | 4/2010 | Constantz et al. |
| 2010/0251632 A1 | 10/2010 | Chen |
| 2011/0006700 A1 | 1/2011 | Chen et al. |
| 2011/0033239 A1 | 2/2011 | Constantz et al. |
| 2011/0042230 A1 | 2/2011 | Gilliam et al. |
| 2011/0174156 A1 | 7/2011 | Saunders et al. |
| 2011/0268633 A1 | 11/2011 | Zou |
| 2011/0290155 A1 | 12/2011 | Vlasopoulos |
| 2012/0082839 A1 | 4/2012 | Ha |
| 2012/0111236 A1 | 5/2012 | Constantz et al. |
| 2013/0008355 A1 | 1/2013 | Stokes |
| 2013/0036945 A1 | 2/2013 | Constantz et al. |
| 2013/0058857 A1 | 3/2013 | Stern et al. |
| 2013/0167756 A1 | 7/2013 | Chen et al. |
| 2014/0097557 A1 | 4/2014 | Alhozaimy |
| 2014/0197563 A1 | 7/2014 | Niven |
| 2014/0356267 A1 | 12/2014 | Hunwick |
| 2015/0021184 A1 | 1/2015 | Lin et al. |
| 2015/0225295 A1 | 8/2015 | McCandlish et al. |
| 2016/0082387 A1 | 3/2016 | Constantz et al. |
| 2016/0280598 A1 | 9/2016 | Wang et al. |
| 2016/0362800 A1 | 12/2016 | Ren et al. |
| 2017/0182458 A1 | 6/2017 | Jiang et al. |
| 2017/0226021 A1 | 8/2017 | Sant et al. |
| 2018/0238157 A1 | 8/2018 | Fu et al. |
| 2018/0341887 A1 | 11/2018 | Kislovskiy et al. |
| 2019/0027771 A1 * | 1/2019 | Feron .................... B01D 53/78 |
| 2019/0177220 A1 | 6/2019 | Sant et al. |
| 2019/0232215 A1 | 8/2019 | Fujita et al. |
| 2019/0233296 A1 * | 8/2019 | Novek ................. B01D 61/027 |
| 2019/0367390 A1 | 12/2019 | Sant et al. |
| 2020/0062645 A1 * | 2/2020 | Gong .................... C04B 28/006 |
| 2020/0129916 A1 * | 4/2020 | Constantz .......... B01D 53/1425 |
| 2020/0180964 A1 | 6/2020 | Sant et al. |
| 2020/0299203 A1 * | 9/2020 | Sant ......................... C04B 2/02 |
| 2021/0024364 A1 | 1/2021 | Sant et al. |
| 2021/0031154 A1 * | 2/2021 | Nakamura ............... B01J 10/02 |
| 2021/0060484 A1 * | 3/2021 | Aziz .................. B01D 53/1493 |
| 2021/0107840 A1 * | 4/2021 | Gong ...................... C04B 14/28 |
| 2021/0120750 A1 * | 4/2021 | Bourhis ................. B01D 53/62 |
| 2021/0162340 A1 | 6/2021 | Constantz et al. |
| 2021/0188671 A1 | 6/2021 | Sant et al. |
| 2021/0198157 A1 * | 7/2021 | Sant ...................... C04B 22/064 |
| 2021/0262320 A1 * | 8/2021 | Nguyen ................ B01D 53/78 |
| 2021/0387139 A1 | 12/2021 | Voskian et al. |
| 2022/0064066 A1 | 3/2022 | Sant et al. |
| 2022/0204401 A1 | 6/2022 | Sant et al. |
| 2022/0212935 A1 | 7/2022 | Sant et al. |
| 2022/0331740 A1 * | 10/2022 | Simonetti ............ B01D 15/363 |
| 2022/0380265 A1 | 12/2022 | Sant et al. |

(56) References Cited

U.S. PATENT DOCUMENTS

| | | | |
|---|---|---|---|
| 2023/0058065 A1* | 2/2023 | Sant | C02F 1/442 |
| 2024/0018669 A1 | 1/2024 | Simonetti et al. | |

FOREIGN PATENT DOCUMENTS

| | | | |
|---|---|---|---|
| EP | 2438977 | B1 | 8/2014 |
| EP | 3177384 | A2 | 6/2017 |
| EP | 3515879 | A1 | 7/2019 |
| EP | 3656750 | A2 | 5/2020 |
| EP | 3744700 | A1 | 12/2020 |
| EP | 3778525 | A1 | 2/2021 |
| JP | H05-294693 | A | 11/1993 |
| JP | H05-330878 | A | 12/1993 |
| JP | 2002-145650 | A | 5/2002 |
| JP | 6970469 | B1 | 11/2021 |
| WO | WO 2000/060141 | A1 | 10/2000 |
| WO | WO 2008/018928 | A2 | 2/2008 |
| WO | WO 2009/078430 | A1 | 6/2009 |
| WO | WO 2010/006242 | A1 | 1/2010 |
| WO | WO 2014/005227 | A1 | 1/2014 |
| WO | WO 2014/009802 | A2 | 1/2014 |
| WO | WO 2015/112655 | A2 | 7/2015 |
| WO | WO 2015/154174 | A1 | 10/2015 |
| WO | WO 2016/022522 | A2 | 2/2016 |
| WO | WO 2016/061251 | A1 | 4/2016 |
| WO | WO 2018/011567 | A1 | 1/2018 |
| WO | WO 2018/058139 | A1 | 3/2018 |
| WO | WO 2018/081308 | A1 | 5/2018 |
| WO | WO 2018/081310 | A1 | 5/2018 |
| WO | WO 2019/006352 | A1 | 1/2019 |
| WO | WO 2019/036386 | A1 | 2/2019 |
| WO | WO-2019161114 | A1 * | 8/2019 ............... A01G 9/18 |
| WO | WO 2019/036676 | A1 | 5/2020 |
| WO | WO 2022/221665 | A1 | 10/2022 |
| WO | WO 2023/069370 | A1 | 4/2023 |
| WO | WO 2024/020027 | A1 | 1/2024 |

OTHER PUBLICATIONS

International Search Report and Written Opinion mailed Oct. 9, 2023, for International Application No. PCT/US2023/024217, 14 pages.
International Search Report and Written Opinion for International Application No. PCT/US2022/046917 dated Feb. 8, 2023, 15 pages.
Glushkov et al., "Composition of gas produced from the direct combustion and pyrolysis of biomass", Process Safety and Environmental Protection, V. 156, 2021, pp. 43-56.
Vega-Vila et al., "Metal cations as inorganic structure-directing agents during the synthesis of phillipsite and tobermorite", Reaction Chemistry and Engineering, Mar. 2023, vol. 8, pp. 1176-1184.
Final Office Action on U.S. Appl. No. 18/171,164 dated Sep. 29, 2023, 14 pages.
Non-Final Office Action on U.S. Appl. No. 18/171,164 dated Jun. 6, 2023, 16 pages.
Abbasi et al., "An investigation of the effect of $RuO_2$ on the deactivation and corrosion mechanism of a $Ti/IrO_2+ Ta_2O_5$ coating in an OER application", journal of Electroanalytical Chemistry 777: 67-74 (2016).
Adenier et al., "Electrochemical Oxidation of Aliphatic Amines and Their Attachment to Carbon and Metal Surfaces," Langmuir, 20: 8243-8253 (2004).
Arshad et al., "Equilibrium Solubility of $CO_2$ in Alkanolamines," DTU Libraryy: 5 pages (2013).
Buck, "Alkali Reactivity of Strained Quartz as a Constituent of Concrete Aggregate," Aug. 1983, 17 pages.
Communication Pursuant to Rules 70(2) and 70a(2) EPC on EP 18845904.4 dated Apr. 28, 2021.
Dutcher et al., "Amine-Based $CO_2$ Capture Technology Development from the Beginning of 2013—A Review," ACS Applied Materials & Interfaces, 7: 2137-2148 (2015).
Eisaman et al., "$CO_2$ separation using bipolar membrane electrodialysis," Energy & Environmental Science, 4: 1319-1328 (2011).
Erans et al., "Direct air capture: process technology, technoeconomic and socio-political challenges," Energy & Environmental Science, 15: 1360-1405 (2022), DOI: 10.1039/d1ee03523a.
Examination Report on IN 201927016758 dated Dec. 14, 2020, 5 pages.
Extended European Search Report on EP Application 18845904.4 dated Apr. 7, 2021.
Extended European Search Report on EP Application No. 17865241.8 dated May 15, 2020, 6 pages.
Falzone et al., "New insights into the mechanisms of carbon dioxide mineralization by portlandite", AIChE Journal, 67(5), 2021, pp. 1-12, 12 pages; AIChE J. 2021;e17160. https://doi.org/10.1002/aic.17160.
Fujimura et al., "Oxygen evolution on manganese-molybdenum oxide anodes in seawater electrolysis", Materials Science and Engineering: A 267.2: 254-259 (1999).
Hashimoto et al., "Advanced materials for global carbon dioxide recycling", Materials Science and Engineering: A 304: 88-96 (2001).
Husebye et al., "Techno economic evaluation of amine based CO2 capture: impact of $CO_2$ concentration and steam supply," Energy Procedia, 23: 381-390 (2012).
International Preliminary Report on Patentability for PCT/US2017/058359 dated May 9, 2019, 7 pages.
International Preliminary Report on Patentability issued in PCT/US2018/040373 dated Jan. 9, 2020, 5 pages.
International Preliminary Report on Patentability on PCT/US2018/046557 dated Feb. 27, 2020, 7 pages.
International Search Report and Written Opinion for Application No. PCT/US2022/025028 dated Jul. 13, 2022.
International Search Report and Written Opinion for International Application No. PCT/US2015/055564 dated Jan. 22, 2016, 13 pages.
International Search Report and Written Opinion issued in PCT Application No. PCT/US2018/040373 dated Sep. 20, 2018, 7 pages.
International Search Report and Written Opinion, issued in corresponding International Application No. PCT/US2018/046557 on Dec. 17, 2018, 12 pages.
International Search Report and Written Opinion, issued in International Application No. PCT/US2017/058359 dated Jan. 9, 2019, 8 pages.
International Search Report and Written Opinion mailed Jun. 15, 2023, for International Application No. PCT/US2023/013350, 10 pages.
International Search Report and Written Opinion mailed Sep. 15, 2023, for International Application No. PCT/US2023/018395, 10 pages.
Ivy, "Summary of Electrolytic Hydrogen Production Milestone Completion Report," National Renewable Energy Laboratory: 27 pages (2004).
Keith et al., "A Process for Capturing $CO_2$ from the Atmosphere," Joule, 2: 1573-1594 (2018).
Keith et al., "Climate Strategy with $CO_2$ Capture From The Air," Climatic Changes: 29 pages (2005).
La Plante et al., "Electrolytic seawater mineralization and how it ensures (net) carbon dioxide removal", Submitted to ACS ES&T Engineering, Jan. 2023, 23 pages.
La Plante et al., "Controls on $CO_2$ Mineralization Using Natural and Industrial Alkaline Solids under Ambient Conditions", ACS Sustainable Chem. Eng., 9(32), pp. 10727-10739, 2021.
Li et al., "pH control using polymer-supported phosponic acids as reusable buffer agents," Green Chem., 2015, vol. 17, pp. 3771-3774.
Liu et al., "Electrochemically mediated carbon dioxide separation with quinone chemistry in salt-concentrated aqueous media," Nature Communications, 11: Article No. 2278 pp. 1-11 (2020).
Lv et al., "Mechanisms of $CO_2$ Capture into Monoethanolamine Solution with Different CO2 Loading during the Absorption/Desorption Processes," Enviromental Science & Technology, 49: 10728-10735 (2015).
MacDowell et al., "An overview of $CO_2$ capture technologies," Energy & Environmental Science, 3: 1645-1669 (2010).

(56) References Cited

OTHER PUBLICATIONS

Marshall et al., "A review of adhesion science", Dental materials 26.2: e11-e16 (2010).
Mehdipour et al., "How Microstructure and Pore Moisture Affect Strength Gain in Portlandite-Enriched Composites That Mineralize $CO_2$", ACS Sustainable Chem. Eng., 7(15), pp. 13053-13061, 2019.
Mehdipour et al., "The role of gas flow distributions on $CO_2$ mineralization within monolithic cemented composites: coupled CFD-factorial design approach", Reaction Chemistry & Engineering 6 (3), pp. 494-504, 2021.
Mezza et al., "An Electrochemical Platform for the Carbon Dioxide Capture and Conversion to Syngas," Energies, 14: 7869 pp. 1-13 (2021).
Murnandari et al., "Effect of process parameters on the $CaCO_3$ production in the single process for carbon capture and mineralization", Korean Journal of Chemical Engineering, Mar. 2017, vol. 34, Issue 3, pp. 935-941.
Final Office Action on U.S. Appl. No. 15/519,524 dated Nov. 21, 2019, 13 pages.
Final Office Action on U.S. Appl. No. 15/519,524 dated Oct. 14, 2020.
Non-Final Office Action on U.S. Appl. No. 15/519,524 dated Apr. 29, 2020, 12 pages.
Non-Final Office Action on U.S. Appl. No. 15/519,524 dated May 16, 2019, 13 pages.
Notice of Allowance on U.S. Appl. No. 15/519,524 dated Feb. 2, 2021.
Office Action on CN 201780076640.2 dated May 7, 2021.
Rahimi et al., "Bench-scale demonstration of $CO_2$ capture with an electrochemically driven proton concentration process," RSC Advances, 10: 16832 (2020).
Ramasubramanian et al., "Membrane processes for carbon capture from coal-fired power plant flue gas: A modeling and cost study," Journal of Membrane Science (2012) 421-422: 299-310.
Rau et al., "Direct electrolytic dissolution of silicate minerals for air CO2 mitigation and carbon-negative $H_2$ production," PNAS, 110(25): 10095-10100 (2013).
Reddy et al., "Simultaneous capture and mineralization of coal combustion flue gas carbon dioxide ($CO_2$)," Energy Procedia, 4, (2011), pp. 1574-1583.
Rinberg et al., "Alkalinity Concentration Swing for Direct Air Capture of Carbon Dioxide," ChemSusChem, 14: 1-16 (2021).
Roussanaly et al., "Techno-economic analysis of Mea $CO_2$ capture from a cement kiln—impact of steam supply scenario," Energy Procedia, 114: 6229-6239 (2017).
Sabatino et al., "Evaluation of a Direct Air Capture Process Combining Wet Scrubbing and Bipolar Membrane Electrodialysis," Industrial & Engineering Chemistry Research, 59: 7007-7020 (2020).
Shu et al., "Electrochemical Regeneration of Spent Alkaline Absorbent from Direct Air Capture," Environmental Science & Technology, 54: 8990-8998 (2020).
Stern et al., "Bench-scale demonstration of $CO_2$ capture with electrochemically-mediated amine regeneration," RSC Advances, 4: 5906-5914 (2014).
Stern et al., "Post-combustion carbon dioxide capture using electrochemically mediated amine regeneration," Energy & Environmental Science, 6: 2505-2517 (2013).
Stripe Carbon Removal Purchase Application submitted Mar. 31, 2022.
Tang et al., "Advances in the application of manganese dioxide and its composites as electrocatalysts for the oxygen evolution reaction", Journal of Materials Chemistry A 8(36): 18492-18514 (2020).
Vance et al., "Direct Carbonation of $Ca(OH)_2$ Using Liquid and Supercritical $CO_2$: Implications for Carbon-Neutral Cementation", Ind. Eng. Chem. Res., 54(36), pp. 8908-8918, 2015.
Voskian et al., "Faradaic electro-swing reactive adsorption for $CO_2$ capture," Energy & Environmental Science, 12: 3530-3547 (2019).
Wang et al. "Technoeconomic Analysis of the Electrochemically Mediated Amine Regeneration $CO_2$ Capture Process" Ind. Eng. Chem. Res., 59: 14085-14095 (Year: 2020).
Wang et al., "$CO_2$ Capture Using Electrochemically Mediated Amine Regeneration," Ind. Eng. Chem. Res. 2020, 59, 15, 7087-7096 27 pages (2020).
Wang et al., "Energetics of electrochemically mediated amine regeneration process for flue gas $CO_2$ capture," International Journal of Greenhouse Gas Control, 82: 48-58 (2019).
Wang et al., "Flue gas $CO_2$ capture via electrochemically mediated amine regeneration: System design and performance," Applied Energy, 255: 113879 (2019).
Wang et al., "Integration of $CO_2$ capture and storage based on pH-swing mineral carbonation using recyclable ammonium salts," Energy Procedia 4, 2011, 4930-4936.
Wei et al., "Clinkering-Free Cementation by Fly Ash Carbonation", Journal of $CO_2$ Utilization, 23, pp. 117-127, 2018.
Ahmad et al., "$CO_2$ removal using membrane gas absorption with PVDF membrane incorporated with POSS and SAPO-34 zeolite", *Chemical Engineering Research and Design* 118: 238-247 (2017).
Anantharaj et al., "Spinel cobalt titanium binary oxide as an all-non-precious water oxidation electrocatalyst in acid." *Inorganic Chemistry* 58.13 (2019): 8570-8576.
Balaji et al., "An alternative approach to selective sea water oxidation for hydrogen production." *Electrochemistry Communications* 11.8 (2009): 1700-1702.
Bennett, "Electrodes for generation of hydrogen and oxygen from seawater." *International Journal of Hydrogen Energy* 5.4 (1980): 401-408.
Bhardwaj et al., "Ultrathin silicon oxide overlayers enable selective oxygen evolution from acidic and unbuffered pH-neutral seawater." *ACS Catalysis* 11.3 (2021): 1316-1330.
Cheng et al., "Synergistic action of Co—Fe layered double hydroxide electrocatalyst and multiple ions of sea salt for efficient seawater oxidation at near-neutral pH." *Electrochimica Acta* 251 (2017): 336-343.
Choi et al., "A Reflection on Sustainable Anode Materials for Electrochemical Chloride Oxidation." *Advanced Materials* 35.43 (2023): 2300429.
De Lannoy et al., "Indirect ocean capture of atmospheric $CO_2$: Part I. Prototype of a negative emissions technology." *International journal of greenhouse gas control* 70 (2018): 243-253.
El-Moneim et al., "Mn—Mo—Sn oxide anodes for oxygen evolution in seawater electrolysis for hydrogen production." *ECS Transactions* 25.40 (2010): 127.
El-Moneim, "Mn—Mo—W-oxide anodes for oxygen evolution during seawater electrolysis for hydrogen production: effect of repeated anodic deposition." International Journal of Hydrogen Energy 36.21 (2011): 13398-13406.
Escudero-Escribano et al. "Importance of surface $IrO_x$ in stabilizing $RuO_2$ for oxygen evolution." *The Journal of Physical Chemistry B* 122.2 (2018): 947-955.
Frydendal et al., "Toward an active and stable catalyst for oxygen evolution in acidic media: Ti-stabilized $MnO_2$." *Advanced Energy Materials* 5.22 (2015): 1500991.
Fujimura et al., "Anodically deposited manganese-molybdenum oxide anodes with high selectivity for evolving oxygen in electrolysis of seawater." *Journal of Applied Electrochemistry* 29 (1999): 769-775.
Fujimura et al., "The durability of manganese-molybdenum oxide anodes for oxygen evolution in seawater electrolysis." *Electrochimica acta* 45.14 (2000): 2297-2303.
Gayen et al., "Selective seawater splitting using pyrochlore electrocatalyst." *ACS Applied Energy Materials* 3.4 (2020): 3978-3983.
Hashimoto et al., "New nanocrystalline manganese-molybdenum-tin oxide anodes for oxygen evolution in seawater electrolysis." *ECS Transactions* 1.4 (2006): 491-497.
Hine et al., "Electrochemical Behavior of the Oxide-Coated Metal Anodes." *Journal of the Electrochemical Society* 126.9 (1979): 1439.
Huynh et al., "A functionally stable manganese oxide oxygen evolution catalyst in acid." *Journal of the American Chemical Society* 136.16 (2014): 6002-6010.

(56) References Cited

OTHER PUBLICATIONS

Huynh et al., "Design of template-stabilized active and earth-abundant oxygen evolution catalysts in acid." *Chemical science* 8.7 (2017): 4779-4794.
Huynh et al., "Nature of activated manganese oxide for oxygen evolution." *Journal of the American Chemical Society* 137.47 (2015): 14887-14904.
Iizuka et al., "Carbon dioxide recovery from carbonate solutions using bipolar membrane electrodialysis", Separation and purification technology 101: 49-59 (2012).
International Search Report and Written Opinion for International Application No. PCT/US2023/028023 dated Nov. 8, 2023.
International Search Report and Written Opinion for International Application No. PCT/US2024/013806 dated May 30, 2024.
Izumiya et al., "Anodically deposited manganese oxide and manganese-tungsten oxide electrodes for oxygen evolution from seawater." *Electrochimica Acta* 43.21-22 (1998): 3303-3312.
Izumiya et al., "Mn—W oxide anodes prepared by thermal decomposition for oxygen evolution in seawater electrolysis." Materials transactions, *JIM* 39.2 (1998): 308-313.
Izumiya et al., "Surface activation of manganese oxide electrode for oxygen evolution from seawater." *Journal of applied electrochemistry* 27 (1997): 1362-1368.
Kato et al., "Electrochemical characterization of degradation of oxygen evolution anode for seawater electrolysis." *Electrochimica Acta* 116 (2014): 152-157.
Kato et al., "Durability enhancement and degradation of oxygen evolution anodes in seawater electrolysis for hydrogen production." *Applied surface science* 257.19 (2011): 8230-8236.
Kiani et al., "Techno-economic assessment for $CO_2$ capture from air using a conventional liquid-based absorption process," Frontiers in Energy Research 8: 92 (2020).
Kwong et al., "Cobalt-doped hematite thin films for electrocatalytic water oxidation in highly acidic media." *Chemical Communications* 55.34 (2019): 5017-5020.
Kwong et al., "High-performance iron (III) oxide electrocatalyst for water oxidation in strongly acidic media." *Journal of Catalysis* 365 (2018): 29-35.
La Plante et al., "Electrolytic Seawater Mineralization and the Mass Balances That Demonstrate Carbon Dioxide Removal." *ACS ES&T Engineering* (2023).
Li et al., "Enhancing the stability of cobalt spinel oxide towards sustainable oxygen evolution in acid." *Nature Catalysis* 5.2 (2022): 109-118.
Li et al., "Oxygen evolution and corrosion behaviours of the porous Mn5Sis electrode in sulfuric acid." *Materials Research Express* 6.8 (2019): 085542.
Li et al., "Stable potential windows for long-term electrocatalysis by manganese oxides under acidic conditions." *Angewandte Chemie* 131.15 (2019): 5108-5112.
Matsui et al., "Anodically deposited manganese-molybdenum-tungsten oxide anodes for oxygen evolution in seawater electrolysis." *Journal of applied electrochemistry* 32 (2002): 993-1000.
McCann et al., "Simulation of Ethalpy and Capacity of $CO_2$ Absorption by Aqueous Amine Systems", Ind. Eng. Chem. Res., 47: pp. 2002-2009 (2008).
McCrory et al., "Benchmarking heterogeneous electrocatalysts for the oxygen evolution reaction." *Journal of the American Chemical Society* 135.45 (2013): 16977-16987.
Minke et al., "Is iridium demand a potential bottleneck in the realization of large-scale PEM water electrolysis ?." *international journal of hydrogen energy* 46.46 (2021): 23581-23590.
Moreno-Hernandez, Ivan A., et al. "Crystalline nickel manganese antimonate as a stable water-oxidation catalyst in aqueous 1.0 $MH_2SO_4$." *Energy & Environmental Science* 10.10 (2017): 2103-2108.

Muroyama et al., "$CO_2$ separation and transport via electrochemical methods", Journal of The Electrochemical Society 167.13: 133504 (2020).
Nagasawa et al., "A new recovery process of carbon dioxide from alkaline carbonate solution via electrodialysis", AlChE journal 55.12: 3286-3293 (2009).
Non-Final Office Action for U.S. Appl. No. 18/171,164 dated Mar. 6, 2024, 22 pages.
Okada et al., "A bilayer structure composed of Mg| Co—MnO2 deposited on a $Co(OH)_2$ film to realize selective oxygen evolution from chloride-containing water." *Langmuir* 36.19 (2020): 5227-5235.
Pal et al., "Adsorptive removal of heat stable salt anions from industrial lean amine solvent using anion exchange resins from gas sweetening unit," Journal of Natural Gas Science and Engineering 15(2013): pp. 14-21 (2013).
Pan et al., "Efficient and stable noble-metal-free catalyst for acidic water oxidation." *Nature communications* 13.1 (2022): 2294.
Sakwattanapong et al., "Behavior of Reboiler Heat Duty for $CO_2$ Capture Plants Using Regenerable Single and Blended Alkanolamines," Ind. Eng. Chem. Res., 44: 4465-4473 (2005).
Seh et al., "Combining theory and experiment in electrocatalysis: Insights into materials design." *Science* 355.6321 (2017): eaad4998.
Seitz et al., "A highly active and stable $IrO_x/SrIrO_3$ catalyst for the oxygen evolution reaction." *Science* 353.6303 (2016): 1011-1014.
Stolaroff et al., "Carbon dioxide capture from atmospheric air using sodium hydroxide spray", Environmental science & technology 42.8: 2728-2735 (2008).
Technical Data Sheet fumasep@ FBM, from Fumasep available online at https://www.bwt.com/en/-/media/bwt/fumatech/datasheets/new/fumasep/water-treatment-processes/fumasep-fbm-wet-formv22. pdf, accessed on Mar. 6, 2024 (Year: 2024).
Tong et al., "Electrolysis of low-grade and saline surface water." *Nature Energy* 5.5 (2020): 367-377.
Vos et al., "$MnO_x/IrO_x$ as selective oxygen evolution electrocatalyst in acidic chloride solution." *Journal of the American Chemical Society* 140.32 (2018): 10270-10281.
Wu et al., "Non-iridium-based electrocatalyst for durable acidic oxygen evolution reaction in proton exchange membrane water electrolysis." *Nature Materials* 22.1 (2023): 100-108.
Xu et al., "Calcination temperature dependent catalytic activity and stability of $IrO_2$-$Ta_2O_5$ anodes for oxygen evolution reaction in aqueous sulfate electrolytes." *Journal of The Electrochemical Society* 164.9 (2017): F895-F900.
Xu et al., "Electrogeneration of hydrogen peroxide using Ti/IrO2-$Ta_2O_5$ anode in dual tubular membranes Electro- Fenton reactor for the degradation of tricyclazole without aeration." *Chemical Engineering Journal* 295 (2016): 152-159.
Yang et al., "Highly acid-durable carbon coated $Co_3O_4$ nanoarrays as efficient oxygen evolution electrocatalysts." Nano Energy 25 (2016): 42-50.
Yu et al., "Sustainable oxygen evolution electrocatalysis in aqueous 1 M $H_2SO_4$ with earth abundant nanostructured $Co_3O_4$." Nature communications 13.1 (2022): 4341.
Zhao et al., "Charge state manipulation of cobalt selenide catalyst for overall seawater electrolysis." *Advanced Energy Materials* 8.29 (2018): 1801926.
Zheng, "Binary platinum alloy electrodes for hydrogen and oxygen evolutions by seawater splitting." *Applied Surface Science* 413 (2017): 72-82.
Zheng, "Pt-free NiCo electrocatalysts for oxygen evolution by seawater splitting." *Electrochimica Acta* 247 (2017): 381-391.
Zhou et al., "Rutile alloys in the Mn—Sb—O system stabilize $Mn^{3+}$ to enable oxygen evolution in strong acid." *Acs Catalysis* 8.12 (2018): 10938-10948.
Renfrew et al., "Electrochemical approaches toward $CO_2$ capture and concentration", ACS Catalysis, 2020, vol. 10, pp. 13058-13074, 17 pages.

\* cited by examiner

INTEGRATION OF DIRECT AIR CAPTURE SYSTEM INTO $CO_2$ MINERALIZATION PROCESS OF CONCRETES AND AGGREGATES

CROSS-REFERENCE TO RELATED APPLICATIONS

This application claims priority to, and the benefit of, U.S. Provisional Patent Application No. 63/256,856, filed Oct. 18, 2021, and titled INTEGRATION OF DIRECT AIR CAPTURE SYSTEM INTO CO2 MINERALIZATION PROCESS OF CONCRETES AND AGGREGATES, the entire contents of which are herein incorporated by reference in its entirety for all purposes.

STATEMENT OF GOVERNMENT SUPPORT

This invention was made with Government support under Contract Nos. DE-FE0029825, DE-FE0031718, and DE-FE0031915 awarded by the United States Department of Energy. The Government has certain rights in the invention.

BACKGROUND

Traditional concrete is a mixture of calcium silicate-dominant ordinary portland cement ("OPC"), mineral aggregates, water, and chemical additives. The reaction of OPC with water (hydration) forms calcium silicate hydrate (C—S—H) compounds. The precipitation of C—S—H between proximate particles induces cohesion/hardening, and the resulting porosity reduction and refinement strengthen the concrete. Due to the significant impact of the construction industry on climate change, there is a pressing demand to implement OPC-alternative cementation solutions with significantly reduced embodied $CO_2$ intensities. Over 30 billion metric tons of concrete are produced per year, involving the production of over 4.5 billion metric tons of cement, with $CO_2$ emissions on the order of 0.8-0.9 $CO_2$/kg cement. Emissions associated with cement production make up over 5% of global $CO_2$ emissions, contributing significantly to global climate change.

Transformative technologies that can capture gigatons (Gt) of $CO_2$ produced from industrial processes (e.g., concrete production) are vital to mitigate climate change. Various $CO_2$ capture, sequestration, and storage processes (CCSS) have been investigated to manage $CO_2$ emissions from various sources. Current technologies for carbon capture using amines rely on a thermal swing cycle in which $CO_2$ is absorbed in a bubble-flow column, after which regeneration of the $CO_2$-rich amine solution occurs in a packed distillation column at >140° C. Although this process has been used for post-combustion capture in power generation, it suffers from large energy intensities needed to: desorb only a fraction (~50%) of the $CO_2$ trapped in the amine solution at large energy intensities (1.2 MWh per tonne of $CO_2$ for power generation and 5.0 MWh per tonne of $CO_2$ for direct air capture ("DAC").

The relatively low extent of amine regeneration leads to low working $CO_2$ absorption capacities (e.g., ~0.05 and 0.25 mol $CO_2$ per mol MEA for DAC and power generation, respectively. (See E. S. Sanz-Pérez, et al., *Direct Capture of $CO_2$ from Ambient Air*, 116 CHEM. REV. 11840-76 (2016).) Further, the high temperatures required for amine regeneration (>140° C.) result in solvent loss via chemical degradation and evaporation. These factors can result in up to a 50% increase in capital expenditures and up to 25% increase in operating expenses, which leads to high costs of carbon capture (>$100 per tonne $CO_2$) and restricts the use of amine-based processes to point source emitters (e.g., fossil-fuel fired power plants).

Use of caustic solutions (e.g., KOH/$K_2CO_3$) for direct air capture also requires high energy intensities to produce mineral reagents for pH swing processes (e.g., 4.5 MWh per tonne $CO_2$ for chlor-alkali to produce NaOH and HCl). Adsorption using solid materials has also been proposed for direct air capture, however, these processes also suffer from high energy requirements for desorption (>2.0 MWh per tonne $CO_2$).

Therefore, there exists great interest in a more efficient and less energy-intensive processes for forming concrete products that harden via contacting concentrated vapor $CO_2$ from a gas source.

SUMMARY OF THE INVENTION

In one aspect, which may be combined with any other aspect or embodiment, the present disclosure relates to a method of forming a concrete product, comprising capturing $CO_2$ from a gas source. In some embodiments, capturing the $CO_2$ comprises contacting the gas source with an absorption solution having a solvent and a solute. In some embodiments, the solvent and/or solute are capable of reacting with $CO_2$ to form an anionic compound. In some embodiments, capturing the $CO_2$ further comprises adjusting the pH of the absorption solution electrochemically to less than about 7 to release the $CO_2$ as a concentrated vapor containing $CO_2$, collecting the concentrated vapor containing $CO_2$, regenerating the solvent and/or the solute, and optionally collecting the regenerated solvent and/or solute. In some embodiments, adjusting the pH of the absorption solution occurs at ambient temperature. In some embodiments, the method further comprises flowing the concentrated vapor containing $CO_2$ through a gas processing unit to adjust at least one of a temperature, a relative humidity, or a flow rate of the concentrated vapor containing $CO_2$. In some embodiments, the method further comprises reacting the concentrated vapor containing $CO_2$ with a concrete component. In some embodiments, the concrete component is a green body.

In some embodiments, including any of the foregoing, the concentrated vapor comprises about 2-99% (v/v) $CO_2$. In some of these embodiments, the concentrated vapor comprises greater than or equal to 2% (v/v) $CO_2$. In certain embodiments, the concentrated vapor comprises less than or equal to 5% (v/v) $CO_2$. In some embodiments, the concentrated vapor comprises 2.0% to 5.0% (v/v) $CO_2$. In some embodiments, the concentrated vapor comprises 2.0, 2.5, 3.0, 3.5, 4.0, 4.5, or 5.0% (v/v) $CO_2$. In certain embodiments, the concentrated vapor comprises 2.0 (v/v) $CO_2$. In certain other embodiments, the concentrated vapor comprises 2.5% (v/v) $CO_2$. In certain embodiments, the concentrated vapor comprises 3.0% (v/v) $CO_2$. In certain other embodiments, the concentrated vapor comprises 3.5% (v/v) $CO_2$. In certain embodiments, the concentrated vapor comprises 4.0% (v/v) $CO_2$. In certain other embodiments, the concentrated vapor comprises 4.5% (v/v) $CO_2$. In certain embodiments, the concentrated vapor comprises 5.0% (v/v) $CO_2$. In some embodiments, the concentrated vapor containing $CO_2$ has a relative humidity that ranges from 10% to 30%.

In some embodiments, including any of the foregoing, the absorption solution comprises one or more amines. In some embodiments, the one or more amines are selected from monoethanolamine (MEA), 2-ethylaminoethanol, 2-methylaminoethanol, ethylenediamine, benzylamine), diethanolamine (DEA), pyrrolidine, morpholine, 2,6-dimethylmorpholine, monoisopropanolamine, piperazine (PZ), 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylaminoethanol (DEAE), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine [1-(2HE)PRLD], 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine [1-(2HE)PP], 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine, 1-ethyl-3-hydroxypiperidine); and mixtures thereof. In some of these embodiments, the one or more amines are selected from monoethanolamine (MEA), 2-ethylaminoethanol, 2-methylaminoethanol, ethylenediamine, benzylamine, diethanolamine (DEA), pyrrolidine, morpholine, 2,6-Dimethylmorpholine, monoisopropanolamine, piperazine (PZ), and combinations thereof. In some other of these embodiments, the one or more amines are selected from monoethanolamine (MEA), piperazine (PZ), and combinations thereof. In some of these embodiments, the one or more amines comprise monoethanolamine (MEA). In some of these embodiments, the one or more amines comprise 2-ethylaminoethanol. In some of these embodiments, the one or more amines comprise 2-methylaminoethanol. In some of these embodiments, the one or more amines comprise ethylenediamine. In some of these embodiments, the one or more amines comprise benzylamine. In some of these embodiments, the one or more amines comprise diethanolamine (DEA). In some of these embodiments, the one or more amines comprise pyrrolidine. In some of these embodiments, the one or more amines comprise morpholine. In some of these embodiments, the one or more amines comprise 2,6-dimethylmorpholine. In some of these embodiments, the one or more amines comprise monoisopropanolamine. In some of these embodiments, the one or more amines comprise piperazine (PZ). In some of these embodiments, the one or more amines comprise 2-(dimethylamino)ethanol (DMAE). In some of these embodiments, the one or more amines comprise N-tert-butyldiethanolamine (tBDEA). In some of these embodiments, the one or more amines comprise 3-dimethylamino-1-propanol (DMA-1P). In some of these embodiments, the one or more amines comprise 3-(dimethylamino)-1,2-propanediol (DMA-1,2-PD). In some of these embodiments, the one or more amines comprise 2-diethylaminoethanol (DEAE). In some of these embodiments, the one or more amines comprise 3-diethylamino-1,2-propanediol (DEA-1,2-PD). In some of these embodiments, the one or more amines comprise 3-diethylamino-1-propanol (DEA-1P). In some of these embodiments, the one or more amines comprise triethanolamine (TEA). In some of these embodiments, the one or more amines comprise 1-dimethylamino-2-propanol (DMA-2P), 1-(2-hydroxyethyl)pyrrolidine [1-(2HE)PRLD]. In some of these embodiments, the one or more amines comprise 1-diethylamino-2-propanol (DEA-2P). In some of these embodiments, the one or more amines comprise 3-pyrrolidino-1,2-propanediol (PRLD-1,2-PD). In some of these embodiments, the one or more amines comprise 2-(diisopropylamino)ethanol (DIPAE). In some of these embodiments, the one or more amines comprise 1-(2-hydroxyethyl) piperidine [1-(2HE)PP]. In some of these embodiments, the one or more amines comprise 2-(dimethylamino)-2-methyl-1-propanol (DMA-2M-1P). In some of these embodiments, the one or more amines comprise 3-piperidino-1,2-propanediol (3PP-1,2-PD). In some of these embodiments, the one or more amines comprise 3-dimethylamino-2,2-dimethyl-1-propanol (DMA-2,2-DM-1P). In some of these embodiments, the one or more amines comprise 3-hydroxy-1-methylpiperidine (3H-1MPP). In some of these embodiments, the one or more amines comprise N-ethyldiethanolamine. In some of these embodiments, the one or more amines comprise 1-ethyl-3-hydroxypiperidine).

In some embodiments, reacting the concentrated vapor containing $CO_2$ with the concrete component further comprises providing a carbonatable concrete mixture, hydrating/reacting the concrete mixture to form the concrete component, and contacting the concrete component with the concentrated vapor $CO_2$ to harden the concrete mixture via the formation of carbonate minerals.

In some embodiments, reacting the concentrated vapor containing $CO_2$ with the concrete component further comprises providing a carbonatable concrete mixture, hydrating the concrete mixture to form the concrete component, and contacting the concrete component with the concentrated vapor $CO_2$ to harden the concrete mixture via the formation of carbonate minerals.

In some embodiments, reacting the concentrated vapor containing $CO_2$ with the concrete component further comprises providing a carbonatable concrete mixture, reacting the concrete mixture to form the concrete component, and contacting the concrete component with the concentrated vapor $CO_2$ to harden the concrete mixture via the formation of carbonate minerals.

In some embodiments, reacting the concentrated vapor containing $CO_2$ with the concrete component further comprises providing a carbonatable concrete mixture, hydrating the concrete mixture to form the concrete component and reacting the concrete mixture to form the concrete component, and contacting the concrete component with the concentrated vapor $CO_2$ to harden the concrete component via the formation of carbonate minerals.

In some embodiments, the concrete mixture comprises portland cement and the concrete component comprises virgin portlandite or portlandite residues. In some embodiments, the concrete mixture comprises portland cement and the concrete component comprises a combination of virgin portlandite and portlandite residues. In some embodiments, the concrete mixture comprises at least one of portlandite, coal combustion residues, recycled concrete aggregates, slag, portland cement, lime, portlandite residues, or natural alkaline rocks. In some embodiments, the concentrated vapor containing $CO_2$ contacts aggregate to form carbonated aggregates that are utilized in the concrete mixture. In some embodiments, the concentrated vapor containing $CO_2$ contacts aggregate to form carbonated aggregates. In certain embodiments, the carbonated aggregates are utilized in a concrete mixture.

In some embodiments, the gas source is an effluent from an industrial source, an atmospheric source, a commercially available $CO_2$ source, or liquefied $CO_2$. In some embodiments, the gas source is an atmospheric source.

In some embodiments, including any of the foregoing, the steps of the method are performed in the order recited.

In some embodiments, including any of the foregoing, the concentrated vapor containing $CO_2$ has a temperature that ranges from 20° C. to 80° C.

In some embodiments, including any of the foregoing, the concentrated vapor containing $CO_2$ has a temperature that ranges from 50° C. to 70° C.

In some embodiments, including any of the foregoing, the method includes collecting the concentrated vapor containing $CO_2$ comprises fractionally enriching the concentration of $CO_2$ in the concentrated vapor containing $CO_2$.

In some embodiments, including any of the foregoing, the concrete mixture comprises portland cement and the concrete component comprises virgin portlandite or portlandite residues.

In some embodiments, including any of the foregoing, the concrete mixture comprises at least one of coal combustion residues, aggregates, recycled concrete aggregates, slag, portland cement, lime, portlandite residues, or natural alkaline rocks.

In some embodiments, including any of the foregoing, the gas source is an effluent from an industrial source, an atmospheric source, a commercially-available $CO_2$ source, or liquefied $CO_2$.

In some embodiments, including any of the foregoing, the gas source is an atmospheric source.

In some embodiments, including any of the foregoing, the method includes adjusting the pH of the absorption solution occurs at ambient temperature.

In some embodiments, including any of the foregoing, the concentrated vapor containing $CO_2$ contacts aggregate wherein adjusting the pH of the absorption solution electrochemically to less than about 7 to release the $CO_2$ as a concentrated vapor containing $CO_2$ comprises using a pH swing induced by water electrolysis in a cell that incorporates at least one ion exchange membrane.

In some embodiments, including any of the foregoing, the method includes collecting the regenerated solvent and/or solute.

In some embodiments, including any of the foregoing, the concrete component comprises aggregates.

In some embodiments, including any of the foregoing, the concrete component is a green body.

In another embodiment, set forth herein is a concrete product formed by a method herein.

In another embodiments, set forth herein is a system for implementing a method herein.

In another embodiment, set forth herein is a system comprising a direct-air capture $CO_2$ system coupled to a carbonation chamber.

BRIEF DESCRIPTION OF THE DRAWINGS

FIG. 2A is a reproduction of FIG. 3(*a*) from Falzone, G., Mehdipour, I., Neithalath, N., Bauchy, M., Simonetti, D., & Sant, G. (2021). New insights into the mechanisms of carbon dioxide mineralization by portlandite. *AIChE Journal,* 67(5), e17160.

FIG. 2B is a reproduction of FIG. 3(*b*) from Falzone, G., Mehdipour, I., Neithalath, N., Bauchy, M., Simonetti, D., & Sant, G. (2021). New insights into the mechanisms of carbon dioxide mineralization by portlandite. *AIChE Journal,* 67(5), e17160.

DETAILED DESCRIPTION

Figure 1:
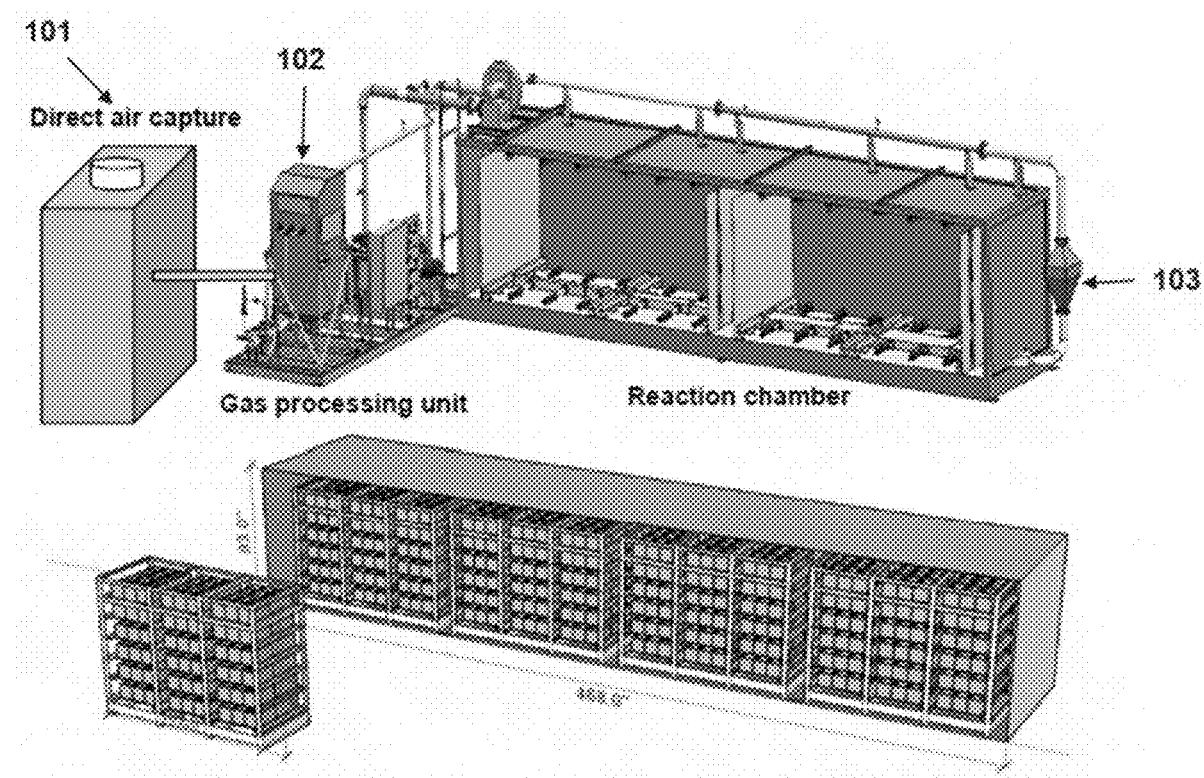
FIG. 1 is a schematic illustration of a manufacturing process including a direct air capture system, a gas processing unit, and a reaction chamber, in accordance with various embodiments.

Embodiments of the present disclosure are directed to integrating direct air capture systems into the $CO_2$ mineralization process of forming cementitious materials and concrete products. The $CO_2$ uptake (quantified as a mass of $CO_2$ incorporated into solid products per mass of initial solid material) describes the material's efficiency in sequestering gaseous $CO_2$ in stable solids. Enhancing $CO_2$ uptake reduces a material's embodied $CO_2$ emissions footprint and allows impactful removal of gaseous $CO_2$ from industrial emissions sources. Such processes include, but are not limited to, those disclosed in PCT International Publication No. WO2016/061251 A1, U.S. Patent Application Publication No. 2019/0177220, which published on Jul. 13, 2019, U.S. Patent Application Publication No. 2020/0299203, which published on Sep. 24, 2022, US Patent Application Publication No. 2022-0227677-A1, which published on Jul. 21, 2022, International PCT Patent Application No. PCT/US22/35289, filed on Jun. 28, 2022, and U.S. patent application Ser. No. 17/722,036, filed Apr. 15, 2022, the entireties of which are hereby incorporated by reference herein for all purposes.

In some cases, there is low accessibility to point-source $CO_2$ emitters for the $CO_2$ mineralization process at masonry/precast concrete plants. When $CO_2$ emitters and masonry/precast concrete plants are not co-located, gas piping is required from the $CO_2$ emitter to the concrete plant. Depending on the piping distance and pipeline logistics, this process may not be technically or economically viable. In present embodiments, an on-site direct air capture system can be integrated into a $CO_2$ mineralization system to source $CO_2$ from ambient air and eliminate the need for piping from point-source $CO_2$ emitters.

In some embodiments, including any of the foregoing, the methods herein comprise flowing the concentrated vapor containing $CO_2$ through a gas processing unit to adjust at least one of a temperature, a relative humidity, or a flow rate of the concentrated vapor containing $CO_2$; and contacting the concentrated vapor containing $CO_2$ with a concrete component.

In some embodiments, the concentrated vapor containing $CO_2$ is piped to the concrete component from an on-site location from where the concrete component is carbonated.

In some embodiments, the concentrated vapor containing $CO_2$ flowing through a gas processing unit does not travel through piping that is longer than 1 kilometer before contacting the concentrated vapor containing $CO_2$ with a concrete component. In some of these embodiments, the concentrated vapor containing $CO_2$ flowing through a gas processing unit does not travel through piping that is longer than 0.5 kilometers before contacting the concentrated vapor containing $CO_2$ with a concrete component. In some of these embodiments, the concentrated vapor containing $CO_2$ flowing through a gas processing unit does not travel through piping that is longer than 10 meters before contacting the concentrated vapor containing $CO_2$ with a concrete component. In some of these embodiments, the concentrated vapor containing $CO_2$ flowing through a gas processing unit does not travel through piping that is longer than 5 meters before contacting the concentrated vapor containing $CO_2$ with a concrete component.

In some of these embodiments, the concentrated vapor containing $CO_2$ is sourced from the atmosphere and not from a point-source $CO_2$ emitter, such as a pressurized tank of $CO_2$.

In one embodiment, as shown in FIG. 1, a manufacturing process of a low-carbon concrete product includes: (1) a direct air capture (DAC) system to derive $CO_2$ from the atmosphere (101), (2) a gas processing unit which conditions the temperature, relative humidity, and flow rate of the incoming $CO_2$ gas stream (102), and (3) a reaction chamber where the $CO_2$ gas stream reacts with green concrete components (103). In such embodiments, integrating optimal direct air capture (DAC) into carbonation processes enables the utilization of fractional enrichment of atmospheric $CO_2$ for producing low-carbon concrete products and carbonation of aggregates. This process may further utilize a smaller scale design and a more energy-efficient DAC system to supply low-cost and fractional $CO_2$ gas streams (>5 vol. % for $CO_2$) for the $CO_2$ mineralization process of concrete and aggregates such as portlandite, coal combustion residues, recycled concrete aggregates, slag, and natural alkaline rocks. In some embodiments, the process herein may further utilize a smaller scale design and a more energy-efficient DAC system to supply low-cost and fractional $CO_2$ gas streams (>4 vol. % for $CO_2$) for the $CO_2$ mineralization process of concrete and aggregates such as portlandite, coal combustion residues, recycled concrete aggregates, slag, and natural alkaline rocks. The carbonated aggregates can then be utilized in concrete.

In such embodiments, including any of the foregoing, the methods herein include fractionally enriching atmospheric $CO_2$ for producing low-carbon concrete products and carbonation of aggregates. In certain embodiments, the methods herein include increasing the concentration of $CO_2$ in the concentrated vapor containing $CO_2$. Fractionally enriching the concentrated vapor containing $CO_2$ includes sequentially increasing the concentration of $CO_2$. This may occur, for example, by collecting and combining low, relative concentration $CO_2$ into a container that increases the total $CO_2$ concentration. For example, in some embodiments, including any of the foregoing, the concentrated vapor containing $CO_2$ includes about 0.04% by volume (v/v) $CO_2$. For example, in some embodiments, including any of the foregoing, after one step of fractional enrichment, the concentrated vapor containing $CO_2$ may increase to 0.5% v/v $CO_2$. For example, in some embodiments, including any of the foregoing, after a second step of fractional enrichment, the concentrated vapor containing $CO_2$ may increase to 0.5% v/v $CO_2$. For example, in some embodiments, including any of the foregoing, after a second step of fractional enrichment, the concentrated vapor containing $CO_2$ may increase to 1% v/v $CO_2$. This process of fractional enrichment may continue to increase gradually to a final and predetermined value. For example, the process of fractional enrichment may continue to increase gradually to a final and predetermined value at 0.5% v/v $CO_2$ per step. In other embodiments, the process of fractional enrichment may continue to increase non-gradually to a final and predetermined value.

Further, atmospheric $CO_2$ may be readily utilized, and this process may eliminate the need for accessibility to point-source $CO_2$ emitters. Thus, the requirement that $CO_2$ emitters and precast concrete plants are not co-located is eliminated. Such an embodiment may also be advantageous when piping from $CO_2$ emitters to precast plants is not economically viable. It is understood that, in some embodiments, the amount of carbon dioxide in the $CO_2$ waste stream (e.g., post-combustion or post-calcination flue gas stream) is greater than concentration of carbon dioxide typically in the atmosphere (about 0.04% (v/v) $CO_2$).

In some embodiments, herein, the methods include in-situ acid/base generation that leads to amine regeneration within a single electrochemical cell.

In some embodiments, a mineralization process directly mineralizes $CO_2$ in dilute flue gas streams into a specially designed concrete mixture formulation in which ordinary portland cement (OPC) is largely replaced by portlandite (also known as hydrated lime produced via hydration of calcium oxide ($Ca(OH)_2$)) and supplementary cementitious materials. Following concrete batching, mixing, and forming, precast concrete components are placed into a carbonation chamber where dilute $CO_2$ may contact the portlandite at ambient pressure and sub-boiling temperatures (e.g., 25° C., 30° C., 35° C., 40° C., 45° C., 50° C., 55° C., 60° C., 65° C., 70° C., 75° C., 80° C., 85° C., 90° C., and 95° C.). Portlandite may react rapidly and readily upon contact with dilute $CO_2$ stream resulting in calcium carbonate formation within the concrete. Calcium carbonate (limestone) may serve as a cementation agent that binds aggregate in concrete. Early-age carbonation curing may result in an increase in volume of reaction products by about 10% which reduces the porosity and enhances the mechanical properties and durability of the concrete.

In some examples, including any of the foregoing, the concentrated vapor comprises about 2-99% (v/v) $CO_2$. In certain examples, the relative humidity (RH) of the concentrated vapor comprising $CO_2$ is value between or equal to 5 to 30%. For example, the RH may be 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, or 30.0. In some of these embodiments, the $CO_2$ concentration in the concentrated vapor is greater than or equal to 2% (v/v) $CO_2$. In some other of these embodiments, the $CO_2$ concentration in the concentrated vapor is less than or equal to 5% (v/v) $CO_2$. In some other of these embodiments, the $CO_2$ concentration in the concentrated vapor is less than or equal to 5% to less than or equal to 35 (v/v) $CO_2$. In some of these embodiments, the $CO_2$ concentration in the concentrated vapor is 2.0, 2.5, 3.0, 3.5, 4.0, 4.5, or 5.0% (v/v) $CO_2$. In some of these embodiments, the $CO_2$ concentration in the concentrated vapor has relative humidity that ranges from 5 to 35%. In some of these embodiments, the $CO_2$ concentration in the concentrated vapor has a relative humidity that ranges from 10-30%. In some of these embodiments, the $CO_2$ concentration in the concentrated vapor has a relative humidity that ranges from 5-30%.

In some examples, including any of the foregoing, the concentrated vapor comprises 2.0% to 5.0% (v/v) $CO_2$.

In some examples, including any of the foregoing, the concentrated vapor containing $CO_2$ has a temperature ranging from 20° C. to 80° C. In certain embodiments, the temperature ranges from 50° C. to 70° C. For example, the temperature may be 20° C., 21° C., 22° C., 23° C., 24° C., 25° C., 26° C., 27° C., 28° C., 29° C., 30° C., 30° C., 31° C., 32° C., 33° C., 34° C., 35° C., 36° C., 37° C., 38° C., 39° C., 40° C., 40° C., 41° C., 42° C., 43° C., 44° C., 45° C., 46° C., 47° C., 48° C., 49° C., 50° C., 50° C., 51° C., 52° C., 53° C., 54° C., 55° C., 56° C., 57° C., 58° C., 59° C., 60° C., 60° C., 61° C., 62° C., 63° C., 64° C., 65° C., 66° C., 67° C., 68° C., 69° C., 70° C., 70° C., 71° C., 72° C., 73° C., 74° C., 75° C., 76° C., 77° C., 78° C., 79° C., or 80° C. In certain embodiments, the temperature ranges from 45° C. to 75° C.

Definitions

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

As used herein, the term "carbonatable concrete mixture" means a mixture comprising, consisting essentially of, or consisting of one or more materials that is capable of reacting with $CO_2$ to form a carbonate. A material capable of reacting with $CO_2$ to form a carbonate includes, but is not limited to, $Ca(OH)_2$, lime kiln dust, lime, hydrated lime, cement kiln dust, calcium-rich coal combustion residues, slag, off-spec fly ashes, biomass ashes, fluidized bed combustion ashes, circulating fluidized bed ashes, off-spec limes, mineral sorbent/scrubbing residues comprising anhydrous CaO and/or $Ca(OH)_2$, and combinations thereof. A material capable of reacting with $CO_2$ may further comprise at least one of oxides, hydroxides, carbonates, silicates, sulfites, sulfates, chlorides, nitrates, or nitrites of calcium and/or magnesium, or any combination thereof. Carbonates include, but are not limited to, $CaCO_3$, $MgCO_3$, and combinations thereof. Carbonates include, but are not limited to, calcium carbonate, calcite, vaterite, aragonite, or any combination thereof. Carbonated materials may include oxides, hydroxides, carbonates, silicates, sulfites, sulfates, chlorides, nitrates, or nitrites of calcium and/or magnesium and/or other uni-/multi-valent elements, or any combination thereof.

As used herein, the term "a carbonated concrete composite," refers to a carbonated concrete object (e.g., a building material) made from early-age (e.g., fresh) concrete that is then contacted with a $CO_2$-containing curing gas having a suitable $CO_2$ concentration.

As used herein, "aluminosilicate mineral materials" refers to materials which include silica and/or alumina in the form of amorphous or crystalline or combination thereof. Alkaline-rich mineral materials include, but are not limited to, coal combustion residues, slag, off-spec fly ashes, biomass ashes, fluidized bed combustion ashes, circulating fluidized bed ashes, calcium rich fly ashes, calcium-poor fly ashes, ponded ashes, landfilled ashes, bottom ashes, flue gas ashes, and combinations thereof. The alkaline-rich mineral materials may further comprise at least one of oxides, hydroxides, carbonates, silicates, sulfites, sulfates, chlorides, nitrates, or nitrites of calcium and/or magnesium, or any combination thereof.

As used herein, the term "green body" refers to a concrete precursor.

As used herein, the term "rate of carbonation" refers to the rate which $CO_2$ is consumed. To quantify the carbonation kinetics, the time-$CO_2$ uptake profiles are fitted to an equation of the form $$C(t)=C(t_u)(1-\exp[(-k_{carb}t)/C(t_u)]) \quad \text{(Eq. 6)}$$

where $k_{carb}$ is the apparent carbonation rate constant and $C(t_u)$ is the ultimate $CO_2$ uptake at the end of carbonation curing duration. For example, a carbonation at or above 0.005 per hour means that $k_{carb}$ is a value 0.005 or greater. This would include, but is not limited to, $k_{carb}$ of 0.05, or 0.5, or 1, or 2.

As used herein, a "concrete product," refers to the product resulting from the carbonation, and optionally the hydration, of a concrete component.

As used herein, a "concrete component," refers to concrete which may be shaped or pressed in a particular form, e.g., an I-beam, a masonry block, or a flat sheet. The fresh (i.e., unreacted) concrete may include portlandite ($Ca(OH)_2$) and is capable of reacting with $CO_2$ to form concrete.

As used herein, an "anionic compound," refers to anions produced when $CO_2$ is absorbed into an amine solution. Anionic compounds include, but are not limited to, $CO_3^{2-}$, $HCO_3^{1-}$, and compounds having negatively charged carboxylic acid groups (i.e., carbamate anions) such as $RNHCO_2^-$ or $RNCOO^{2-}$ wherein R is an organic substituent such as methyl, ethyl, or propyl.

As used herein, "regenerating," refers to the process of reversibly removing absorbed $CO_2$ from an amine-containing solution.

As used herein, "virgin portlandite," refers to portlandite (e.g., $Ca(OH)_2$)) which has not reacted with $H_2O$ or $CO_2$.

As used herein, "portlandite residues" refers to portlandite (e.g., $Ca(OH)_2$)) which has reacted with $H_2O$ and/or $CO_2$, but which could still react further with $H_2O$ and/or $CO_2$, or other compounds that are partially carbonated.

As used herein, the term "active carbonation," refers to a process which results in a carbonation reaction rate that is above a natural value. Herein, the natural value is the rate of carbonation if the material being carbonated is exposed to atmospheric levels of $CO_2$ (0.04% v/v) at room temperature and 1 atm. For example, a carbonation rate at or above 0.005 per hour is a non-limiting example of active carbonation.

As used herein, the term "concrete containing carbonated materials," refers to a concrete object that is composed of carbonated materials in the form of slurry, aggregate, or dry powder, or any combinations thereof.

As used herein, the phrase "concentrated vapor containing $CO_2$," refers to a gaseous stream that has a higher concentration of $CO_2$ than air does. The concentrated vapor containing $CO_2$ may include air, as well as the individual components of air, such as, but not limited to, $N_2$, $O_2$, water, and combinations thereof. In some examples, the concentrated vapor containing $CO_2$ is processed so it has a particular relative humidity, a particular temperature, a particular flow rate, or a combination thereof. In some examples, the concentrated vapor is processed so it has a particular $CO_2$ concentration. This may be accomplished using fractional enrichment processes that progressively increase the concentration of $CO_2$ in a gas that already has higher concentration of $CO_2$ than air does.

$CO_2$ Absorption by Electrochemically-Induced pH-Swing Process in DAC Systems

In some embodiments, including any of the foregoing, DAC systems use amine-based absorption to remove $CO_2$.

As shown in a portion of FIG. 1, forming a low-carbon concrete product may first include integrating a DAC system into the $CO_2$ mineralization process. During a conventional amine scrubbing process, $CO_2$-containing gases, are contacted with a concentrated (20-50% v/v) aqueous amine solution. This solution is an aqueous solution with an amine solute. Under basic conditions (pH>10), absorption occurs via the reaction of $CO_2$ with the amine (e.g., MEA; $RNH_2$ where $R\!=\!CH_2CH_2OH$) to form carbamate anions ($RNHCOO^-$, $RNCOO^{2-}$), protonated amines ($RNH_3^+$), and protons/hydronium ions ($H^+/H_3O^+$), according to Equations 1-3, while other gases, such as $N_2$ and $O_2$, escape in the effluent. $CO_2$ also forms carbonates at high pH (Equation 4).[4]

  (1)

  (2)

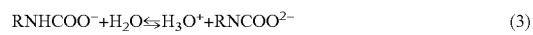  (3)

  (4)

The state-of-the art for releasing the $CO_2$ and regenerating the amine is a thermal process. In the thermal process, the solution is heated to elevated temperatures (>140° C.) where the carbamate decomposes to yield the original amine molecule and release $CO_2$ as a concentrated vapor.[3, 5-6] However, large thermal duties (e.g., >5 MWh/tonne of $CO_2$ for a working capacity of 0.05 mol/mol for DAC applications)[3] render the thermal process economically unattractive. Further, the high temperatures required for amine regeneration can result in solvent loss via chemical degradation and evaporation.[3]

An alternative to thermal amine regeneration is to shift the pH of the solution to acidic conditions (pH≤7), which favors the decomposition of the carbamate ions (via acid-hydrolysis) according to the reverse of Equations (1) and (3).

In some embodiments, the methods and systems set forth herein include methods for shifting the pH of the solution using a method other than the thermal amine regeneration method. For example, in some embodiments, including any of the foregoing, the methods and systems herein include a pH swing. The pH swing may include an electrolysis system. The pH swing may include at least one or ion exchange membranes [cation exchange membrane (CEM) and an anion exchange membrane (AEM)]. The pH swing may include an ion exchange resin (e.g., an anion exchange resin).

In some embodiments, including any of the foregoing, the pH-swing process can occur at ambient temperatures, and therefore offers the following advantages: (1) simpler process equipment requirements; (2) utilization of the maximum working capacity of the amine; and (3) reduced solvent loss. However, the requirement for acids and bases as stoichiometric reagents to shift the pH renders pH-swing processes unfeasible for widespread adoption. An alternative to mineral acids and bases is to use water electrolysis to generate the necessary protons for carbamate ion hydrolysis (e.g., to convert a rich amine solution to a lean solution) and to generate hydroxide ions needed to increase the pH of the lean solution for subsequent cycles of $CO_2$ absorption.

In some embodiments, including any of the foregoing, the methods herein include a step or a series of steps which comprise electrolysis and the use of at least one or more ion exchange membranes.

In some embodiments, including any of the foregoing, the methods herein include a step or a series of steps which comprise electrolysis and the use of two ion exchange membranes: a cation exchange membrane (CEM) and an anion exchange membrane (AEM). In some of these embodiments, the methods further include the use of a strong base anion exchange resin.

In the water electrolysis approach, protons are generated from aqueous solutions at the anode (with hydroxide ions generated at the cathode) in an electrochemical cell according to Equations (5) and (6) below:

$$2H_2O(l) \rightarrow O_2(g) + 4H^+(aq) + 4e^- \quad (5)$$

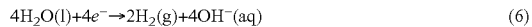

$$4H_2O(l) + 4e^- \rightarrow 2H_2(g) + 4OH^-(aq) \quad (6)$$

The aqueous solution at the anode is referred as an anolyte. The protons diffuse into the rich amine solution across a cation exchange membrane (CEM) resulting in a decrease in the pH which leads to the decomposition of carbamate ions and release of $CO_2$. A CEM is included to prevent diffusion of carbamate anions into the anode and cathode cells, thereby preventing electro-oxidation of carbamates/MEA. To maintain electroneutrality, a concentrated salt solution (e.g., NaCl or $NaNO_3$) is used to provide counter anions to the amine solution and cations to the catholyte. An anion exchange membrane (AEM) prevents the diffusion of the salt solution cations into the aqueous amine solution (e.g., MEA compartment of a cell). After $CO_2$ is released, the lean amine solution is restored to high pH using a strong base anion exchange resin. This resin exchanges the counter ions (e.g., $Cl^-$ or $NO_3^-$) from the salt reservoir (e.g., that have accumulated in the amine solution) with hydroxide ions to increase the pH of the lean amine to its original basic value.

In some embodiments, including any of the foregoing, the anion exchange resin is regenerated using the hydroxide rich solution from the cathode compartment of the electrochemical cell, thereby recovering the anions used in the salt solution compartment. This regeneration process ensures efficient recycling of the necessary reagents, minimizing operating costs and preventing waste generation. This electrochemically-induced pH-swing process has the advantages of replacing hazardous, expensive, carbon-intensive reagents (e.g., mineral acids) with an abundant and benign source (e.g., water) while leveraging renewable energy to facilitate the process.

In some embodiments, the methods of the present disclosure include a method or step of directly capturing $CO_2$ from a gas source, comprising: contacting the gas source comprising $CO_2$ with an absorption solution comprising a solvent and a solute.

In some embodiments, including any of the foregoing, the methods of the present disclosure include a method or step of capturing $CO_2$ from a gas source, comprising: contacting the gas source comprising $CO_2$ with an absorption solution comprising a solvent and a solute. The solvent and a solute may be an aqueous amine solution as set forth in this disclosure. The solvent and/or the solute are capable of forming an anionic complex. The method of directly capturing $CO_2$ further includes adjusting the pH of the absorption solution electrochemically to less than about 7; collecting the $CO_2$ as a concentrated vapor that is released during or after the pH adjusting step; regenerating the solvent and/or solute; and optionally collecting the regenerated solvent and/or solute. In some embodiments, the pH is adjusted to less than 6. In some other embodiments, the pH is adjusted to less than 5. In other embodiments, the pH is adjusted to less than 4. In some embodiments, the pH is adjusted to less than 3. In some embodiments, the absorption solution comprise one or more amines. In some embodiments, the anionic complex comprises carbamate ions and/or a hydroxide (e.g., sodium hydroxide, potassium hydroxide). In some embodiments, the solvent is an amine. In some embodiments, the amine is $R_xNH_{3-x}$, wherein R is selected from an optionally substituted alkyl, ether, or alcohol; and wherein x is an integer from and including 0 to, and including, 3

In some embodiments, the pH adjusting step is performed via water electrolysis. In some embodiments, the $CO_2$ gas source is an effluent from an industrial source (e.g., flue gas emitted from a natural gas-fired power plant, a coal-fired power plant, an iron mill, a steel mill, a cement plant, an ethanol plant, or a chemical manufacturing plant). In some embodiments, the $CO_2$ source is an atmospheric source (e.g., ambient air). In some embodiments, the $CO_2$ source is a commercial product such as a commercially available $CO_2$. In some embodiments, the $CO_2$ source is liquefied $CO_2$. In some embodiments, the pH adjusting step is performed at a temperature of less than about 100° C. In some embodiments, the pH adjusting step occurs at ambient temperature (e.g., about 25° C.). In some embodiments, including any of the foregoing, the pH adjusting step occurs at a temperature of greater than, or equal to, 45° C., to less than, or equal to 75° C. In some embodiments, including any of the foregoing, the pH adjusting step occurs at a temperature of greater than, or equal to, 35° C., to less than, or equal to 65° C. In some embodiments, including any of the foregoing, the pH adjusting step occurs at a temperature of greater than, or equal to, 35° C., to less than, or equal to 75° C. In some embodiments, including any of the foregoing, the pH adjusting step occurs at a temperature of greater than, or equal to, 55° C., to less than, or equal to 75° C. In some embodiments, including any of the foregoing, the pH adjusting step occurs at a temperature of greater than, or equal to, 25° C., to less than, or equal to 55° C. In some embodiments, including any of the foregoing, the pH adjusting step occurs at a temperature of greater than, or equal to, 25° C., to less than, or equal to 35° C. In some embodiments, the pH adjusting step occurs at ambient temperature and pressure (e.g., about 1 atm). In some embodiments, the regenerated amine is collected and used for the same process again.

In some embodiments, the amine comprises: one or more primary amines (e.g., monoethanolamine (MEA), 2-ethylaminoethanol, 2-methylaminoethanol, ethylenediamine, benzylamine); one or more secondary amines (e.g., diethanolamine (DEA), pyrrolidine, morpholine, 2,6-dimethylmorpholine, monoisopropanolamine, piperazine (PZ)); one or more tertiary amines (e.g., 2-(dimethylamino)ethanol (DMAE), N-tert-butyldiethanolamine (tBDEA), 3-dimethylamino-1-propanol (DMA-1P), 3-(dimethylamino)-1,2-propanediol (DMA-1,2-PD), 2-diethylaminoethanol (DEAE), 3-diethylamino-1,2-propanediol (DEA-1,2-PD), 3-diethylamino-1-propanol (DEA-1P), triethanolamine (TEA), 1-dimethylamino-2-propanol (DMA-2P), 1-(2-hydroxyethyl)pyrrolidine [1-(2HE)PRLD], 1-diethylamino-2-propanol (DEA-2P), 3-pyrrolidino-1,2-propanediol (PRLD-1,2-PD), 2-(diisopropylamino)ethanol (DIPAE), 1-(2-hydroxyethyl)piperidine [1-(2HE)PP], 2-(dimethylamino)-2-methyl-1-propanol (DMA-2M-1P), 3-piperidino-1,2-propanediol (3PP-1,2-PD), 3-dimethylamino-2,2-dimethyl-1-propanol (DMA-2,2-DM-1P), 3-hydroxy-1-methylpiperidine (3H-1MPP), N-ethyldiethanolamine, 1-ethyl-3-hydroxypiperidine); and mixtures thereof.

In some embodiments, the amine is monoethanolamine (MEA). In other embodiments, the amine is a combination of monoethanolamine (MEA) and one or more other amines.

In some embodiments, the amine is piperazine. In other embodiments, the amine is a combination of piperazine and one or more additional amines.

In some embodiments, the amine is a combination of monoethanolamine (MEA) and piperazine. In other embodiments, the amine is a combination of monoethanolamine (MEA), piperazine, and one or more additional amines.

In some embodiments, the solution absorbing $CO_2$ has a basic pH (e.g., >7). In some embodiments, the pH of the solution absorbing $CO_2$ is greater than about 7, greater than about 7.5, greater than about 8, greater than about 8.5, greater than about 9, greater than about 9.5, greater than about 10, greater than about 10.5, greater than about 11, greater than about 11.5, or greater than about 12, or any range or value therein between. In some embodiments, the solution absorbing $CO_2$ has a pH of about 7, about 7.5, about 8, about 8.5, about 9, about 9.5, about 10, about 10.5, about 11, about 11.5, about 12, about 12.5, about 13, about 13.5, or about 14, or any range or value therein between.

In some embodiments, the $CO_2$ absorption step is performed at a temperature of less than about 100° C., less than about 95° C., less than about 90° C., less than about 85° C., less than about 80° C., less than about 75° C., less than about 70° C., less than about 65° C., less than about 60° C., less than about 55° C., less than about 50° C., less than about 45° C., less than about 40° C., less than about 30° C., or less than about 25° C., or any range or value therein between. In some embodiments, the $CO_2$ absorption step is performed at a temperature of about 100° C., about 95° C., about 90° C., about 85° C., about 80° C., about 75° C., about 70° C., about 65° C., about 60° C., about 55° C., about 50° C., about 45° C., about 40° C., about 30° C., or about 25° C., or any range or value therein between. In some embodiments, the $CO_2$ absorption step is performed under ambient conditions (e.g., room temperature and pressure).

In some embodiments, the pH of the solution is adjusted electrochemically to release the $CO_2$ as a concentrated vapor. In some embodiments, the pH of the solution is adjusted to less than about 7.5, less than about 7, less than about 6.5, less than about 6, less than about 5.5, less than about 5, less than about 4.5, less than about 4, less than about 3.5, less than about 3, less than about 2.5, less than about 2, less than about 1.5, or less than about 1, or any range or value therein between. In some embodiments, the pH of the solution is adjusted about 7.5, about 7, about 6.5, about 6, about 5.5, about 5, about 4.5, about 4, about 3.5, about 3, about 2.5, about 2, about 1.5, or about 1, or any range or value therein between. Herein, electrochemical adjustment includes the use of water electrolysis.

In some embodiments, the pH adjusting step is performed at a temperature of less than about 100° C., less than about 95° C., less than about 90° C., less than about 85° C., less than about 80° C., less than about 75° C., less than about 70° C., less than about 65° C., less than about 60° C., less than about 55° C., less than about 50° C., less than about 45° C., less than about 40° C., less than about 30° C., or less than about 25° C., or any range or value therein between. In some embodiments, the pH adjusting step is performed at a temperature of about 100° C., about 95° C., about 90° C., about 85° C., about 80° C., about 75° C., about 70° C., about 65° C., about 60° C., about 55° C., about 50° C., about 45° C., about 40° C., about 30° C., or about 25° C., or any range or value therein between. In some embodiments, the pH adjusting step is performed under ambient conditions (e.g., room temperature and pressure). In such embodiments, the pH adjusting step requires simpler process equipment, allows for complete amine regeneration, thus maximizing working capacity, and exhibits reduced solvent loss.

In some embodiments, the pH adjusting step is performed at a temperature of 45° C. to 75° C.

In some embodiments, the pH adjusting step is performed at a temperature of 55° C. to 75° C.

In some embodiments, the pH adjusting step is performed at a temperature of 65° C. to 75° C.

In some embodiments, the pH adjusting step is performed at a temperature of 45° C. to 65° C.

In some embodiments, the pH adjusting step is performed at a temperature of 55° C. to 65° C.

In some embodiments, the pH adjusting step is performed at a temperature of 44° C. to 55° C.

In some embodiments, the pH adjusting step is performed at an ambient pressure. In some embodiments, the pressure is at a pressure in a range of about 0.5 to about 10 atm (e.g., 0.5 atm, 1 atm, 2 atm, 3 atm, 4 atm, 5 atm, 6 atm, 7 atm, 8 atm, 9 atm, or 10 atm).

In some embodiments, the concentrated vapor comprises (v/v) about 2% to about 99% $CO_2$, about 2% to about 95% $CO_2$, about 2% to about 90% $CO_2$, about 2% to about 85% $CO_2$, about 2% to about 80% $CO_2$, about 2% to about 75% $CO_2$, about 2% to about 70% $CO_2$, about 2% to about 65% $CO_2$, about 2% to about 60% $CO_2$, about 2% to about 55% $CO_2$, about 2% to about 50% $CO_2$, about 2% to about 45% $CO_2$, about 2% to about 40% $CO_2$, about 2% to about 35% $CO_2$, about 2% to about 30% $CO_2$, about 2% to about 25% $CO_2$, about 2% to about 20% $CO_2$, about 2% to about 15% $CO_2$, about 2% to about 10% $CO_2$, about 2% to about 5% $CO_2$, or any range or value therein. In some embodiments, the concentrated vapor comprises (v/v) about 2% $CO_2$, about 5% $CO_2$, % $CO_2$, about 10% $CO_2$, about 15% $CO_2$, about 20% $CO_2$, about 25% $CO_2$, about 30% $CO_2$, about 35% $CO_2$, about 40% $CO_2$, about 45% $CO_2$, about 50% $CO_2$, about 55% $CO_2$, about 60% $CO_2$, about 65% $CO_2$, about 70% $CO_2$, about 75% $CO_2$, about 80% $CO_2$, about 85% $CO_2$, about 90% $CO_2$, about 95% $CO_2$, about 96% $CO_2$, about 97% $CO_2$, about 98% $CO_2$, about 99% $CO_2$, or greater, or any range or value therein between. In some embodiments, the concentrated vapor comprises (v/v) greater than or equal to about 4% $CO_2$. In some embodiments, the concentrated vapor comprises (v/v) greater than or equal to about 5% $CO_2$. In some embodiments, the concentrated vapor comprises (v/v) greater than or equal to about 10% $CO_2$. In some embodiments, the concentrated vapor comprises (v/v) greater than or equal to about 15% $CO_2$.

A proof-of-concept of an electrochemical pH-swing system is disclosed in U.S. patent application Ser. No. 17/722,036, filed Apr. 15, 2022, which is hereby incorporated by reference in its entirety, including pages 7-10 and FIG. 4.

Flowing the Concentrated Vapor Through a Gas Processing Unit

In some embodiments, methods according to the present disclosure include a method or step of flowing the concentrated vapor produced in the $CO_2$ absorption step discussed above through a gas processing unit, also shown in FIG. 1. In some embodiments, the method or step of flowing the concentrated vapor through the gas processing unit includes adjusting the temperature, relative humidity, and flow rate of the concentrated vapor. In some embodiments, the temperature of the concentrated vapor may be adjusted to be in a range of about 15° C. to about 100° C. (e.g., 15° C., 25° C., 35° C., 45° C., 55° C., 65° C., 75° C., 85° C., 95° C., or 100° C., inclusive). In some embodiments, the relative humidity of the concentrated vapor may be adjusted to be in a range of about 0% to about 95% (e.g., 0%, 10%, 20%, 30%, 40%, 50%, 60%, 70%, 80%, 90%, or 95%, inclusive). In some embodiments, the flow rate of the concentrated vapor may be adjusted to be in a range of about 50 SCFM to about 5000 SCFM (e.g., 50 SCFM, 100 SCFM, 500 SCFM, 1000 SCFM, 2500 SCM, or 5000 SCFM, inclusive).

Contacting the Concentrated Vapor in a Reaction Chamber

In some embodiments, methods according to the present disclosure include a method or step of contacting the concentrated vapor in a reaction chamber with a concrete component so as to form a low-carbon concrete product, as also shown in FIG. 1. In some embodiments, a carbonatable concrete mixture is provided in the reaction chamber. In some embodiments, the concrete mixture may be ordinary portland cement (OPC). In some embodiments, the concrete mixture may comprise at least one of portlandite (e.g., commercially-available "virgin" portlandite or portlandite residues), coal combustion residues, recycled concrete aggregates, slag, portland cement, lime, or natural alkaline rocks. In some embodiments, the concrete mixture may be processed by any suitable processing step, such as, but not limited to, concrete batching, mixing, and forming.

In some embodiments, the concrete mixture may then be hydrated so as to form a concrete component. In some embodiments, a cementitious slurry is formed. In some embodiments, the cementitious slurry contains a concrete component. In some embodiments where the concrete mixture is portland cement, the concrete component comprises virgin portlandite or portlandite residues. The cementitious slurry may formed by combining water and a binder including the concrete component, and optionally cement and coal combustion residues (e.g., fly ash) at a water-to-binder mass ratio (w/b) of about 0.5 or less, about 0.45 or less, about 0.4 or less, about 0.35 or less, about 0.3 or less, about 0.25 or less, about 0.2 or less, about 0.15 or less, about 0.1 or less, or any range or value therein between. In some embodiments, forming the cementitious slurry includes combining water and a binder including a cement, virgin portlandite or portlandite residues, and coal combustion residuals.

Coal combustion residues may include coal ash and can include components such as those residuals produced when coal is burned by power plants. Coal ash may comprise at least one of fly ash, bottom ash, and boiler slag. Fly ash may generally comprise silica and can be made from the burning of finely ground coal.

In some embodiments, forming the cementitious slurry may include drying the cementitious slurry. In some embodiments, the cementitious slurry may then be shaped by any suitable method, such as dry-casting, wet-casting, any combination thereof, or any other suitable method. Drying and/or shaping the cementitious slurry may reduce a fraction of pore volume that is saturated with liquid water (Sw) to less than 1, such as about 0.9 or less, about 0.8 or less, about 0.7 or less, about 0.6 or less, about 0.5 or less, about 0.4 or less, about 0.3 or less, 0.2 or less, and down to about 0.1, or any range or value therein between.

Systems

Also set forth herein are systems for implementing the methods disclosed herein.

In some embodiments, including any of the foregoing, set forth herein is a system for implementing a method or process disclosed herein. In some examples, the system includes a direct-air capture $CO_2$ system coupled to a carbonation chamber.

In some embodiments, including any of the foregoing, the system further comprises a pH swing.

In some embodiments, including any of the foregoing, the system further includes a gas processing unit configured to adjust at least one of a temperature, a relative humidity, or a flow rate of a concentrated vapor containing $CO_2$.

In some embodiments, including any of the foregoing, the system includes concrete components inside the carbonation chamber.

In some embodiments, including any of the foregoing, the system includes concrete components are arranged in a periodic manner.

In some embodiments, including any of the foregoing, the system includes concrete components are arranged to minimize turbulent air flow.

In some embodiments, including any of the foregoing, the system includes concrete components are arranged to maximize carbonation rates.

In some embodiments, including any of the foregoing, the system includes a device for fractionally enriching the concentration of $CO_2$ in the concentrated vapor containing $CO_2$.

In some embodiments, including any of the foregoing, the system includes at least one ion exchange membrane.

EXAMPLES

Example 1

Figure 2A:
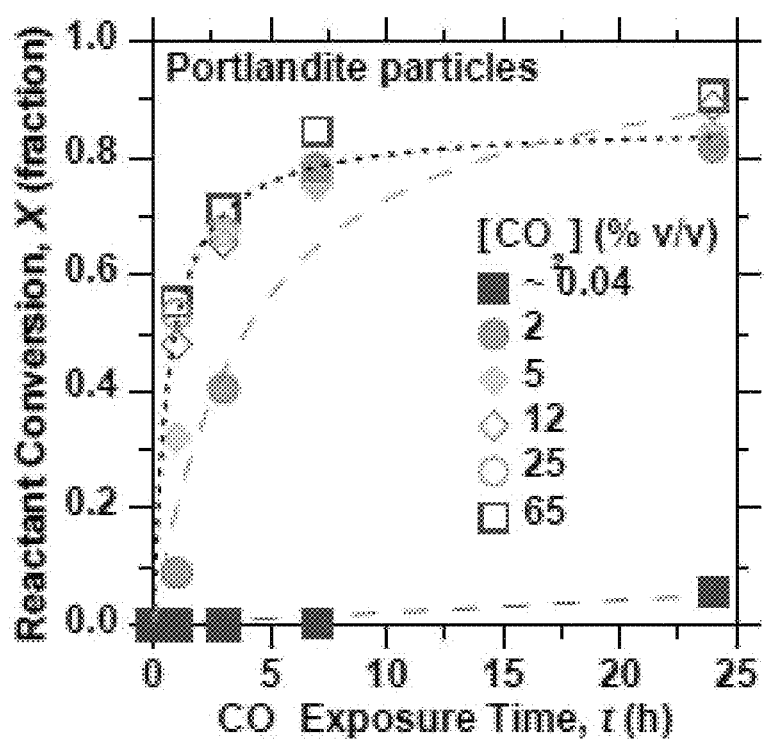
FIG. 2A is a plot of conversion-time profiles of portlandite particles exposed to gas streams with varying CO2 concentrations (% v/v).
Figure 2B:
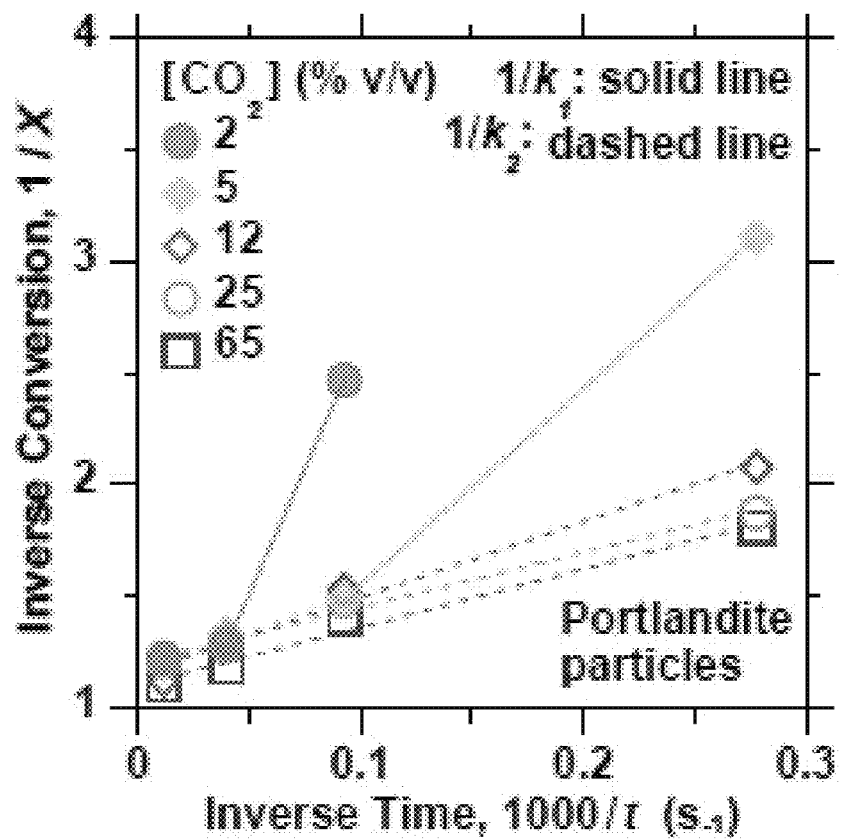
FIG. 2B is a plot of linearized conversion curves of carbonation rates of portlandite particles.

In some embodiments, the concentrated vapor obtained by DAC systems and adjusted through the gas processing unit may then contact the concrete component. In some embodiments, the concrete component comprises portlandite which readily carbonates in dilute $CO_2$ streams with greater than 2% $CO_2$ (v/v) at ambient pressure and ambient temperature, forming calcium carbonate. As shown in FIGS. 2A and 2B, reaction kinetics of portlandite is largely independent of $CO_2$ concentration when $CO_2$ concentration is greater than or equal to 2% (v/v) which allows for integrating a simple and cost-effective DAC system for the $CO_2$ mineralization process in concrete to supply dilute $CO_2$ streams when $CO_2$ emitters and precast concrete plants are not co-located. FIG. 2b also shows a larger increase in reactant conversion between 2% $CO_2$ and 5% $CO_2$. The difference in reactant conversion above 5% is less than the difference between 2% $CO_2$ and 5% $CO_2$ for exposure times less than about 7 hours. At longer exposure time periods, e.g., at 25 hours, FIG. 2A shows that 2% $CO_2$ and 5% $CO_2$ have about the same reactant conversion fraction as does 65% $CO_2$. FIG. 2B demonstrates that low concentration $CO_2$ (e.g., 2% to 5% $CO_2$) from DAC is suitable for achieving high reactant conversion fractions. FIGS. 2A and 2B were previously published in Falzone, G., Mehdipour, I., Neithalath, N., Bauchy, M., Simonetti, D., & Sant, G. (2021). New insights into the mechanisms of carbon dioxide mineralization by portlandite. *AIChE Journal*, 67(5), e17160, the entire contents of which are herein incorporated by reference in its entirety for all purposes.

FIG. 2A shows a conversion-time profile plot of portlandite particles exposed to gas streams conditioned to varying $CO_2$ concentrations $[CO_2]$ (% v/v) at a temperature of 65° C., relative humidity of 80%, and a 2 slpm flow rate. The data in the plot in FIG. 2A is fitted to Equation (7) below:

$$X(t) = X_f \frac{kt}{X_f + kt} \quad (7)$$

Equation 7 is used to estimate the final conversion fraction $X_f$ and the apparent first-order rate constant of carbonation k [s$^{-1}$]. The conversion reaction kinetics of the portlandite is largely independent of $CO_2$ concentration when $CO_2$ concentration is greater than or equal to 5% (v/v).

FIG. 2B shows a conversion curve plot between inverse time and inverse conversion. FIG. 2B shows stronger bi-linearity as the $CO_2$ concentration is reduced. Data at atmospheric $CO_2$ concentration (about 0.04% (v/v)) is not shown. A steeper slope of the curve fits indicates a smaller carbonation rate constant. Therefore, conversion reaction kinetics of the portlandite is largely independent of $CO_2$ concentration when $CO_2$ concentration is greater than or equal to 5% (v/v). When $CO_2$ concentration is less than 5% (v/v), the conversion reaction kinetics (such as the rate constant k) is largely dependent on the $CO_2$ concentration.

Example 2

Figure 3A:
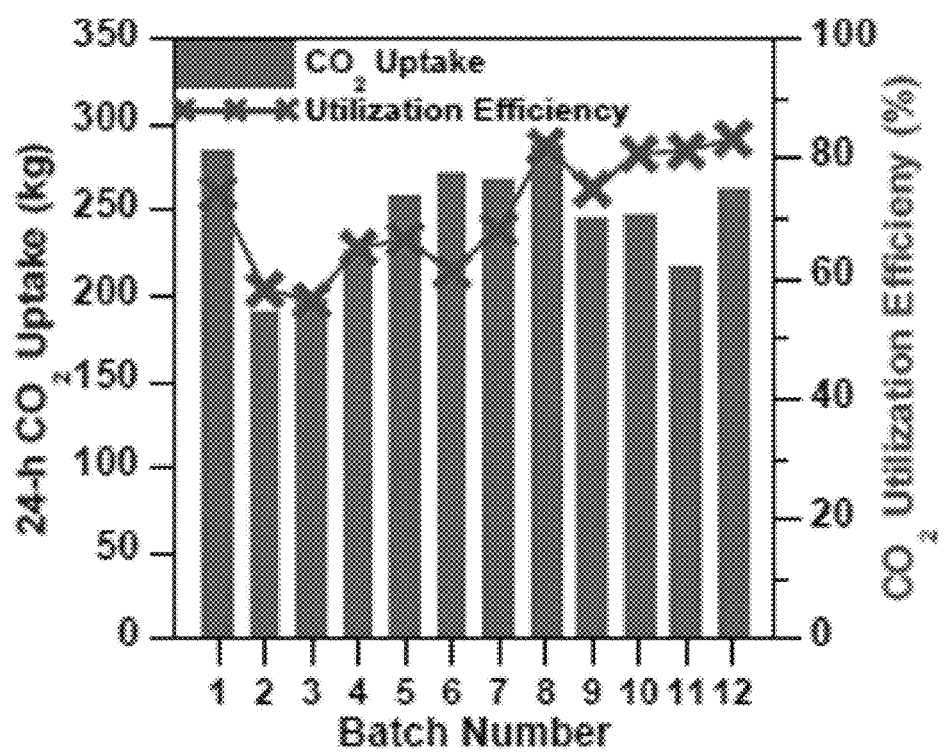
FIG. 3A is a plot of batch-wise trends for the $CO_2$ uptake and $CO_2$ utilization efficiency of producing concrete blocks at a first facility using coal-fired flue gas stream.

FIG. 3A shows the batch-wise trends for $CO_2$ uptake and $CO_2$ utilization efficiency of produced concrete masonry blocks at a first facility from the $CO_2$ mineralization process discussed above. In FIG. 3A, all of the batches used a coal-fired flue gas stream with an average $CO_2$ concentration of about 12% (v/v). Twelve production runs were demonstrated at the first facility. The system's performance fulfilled all design specifications including: (i) $CO_2$ utilization efficiency greater than 75% (mass basis); (ii) $CO_2$ uptake greater than 0.25 tonnes per batch; and (iii) product compliance with industry construction standards.

Concrete blocks were composed of cement, fly ash, portlandite and aggregates.

Portlandite was the primary reactant in concrete block to absorb $CO_2$. Each batch included substantially the same starting materials.

Figure 3B:
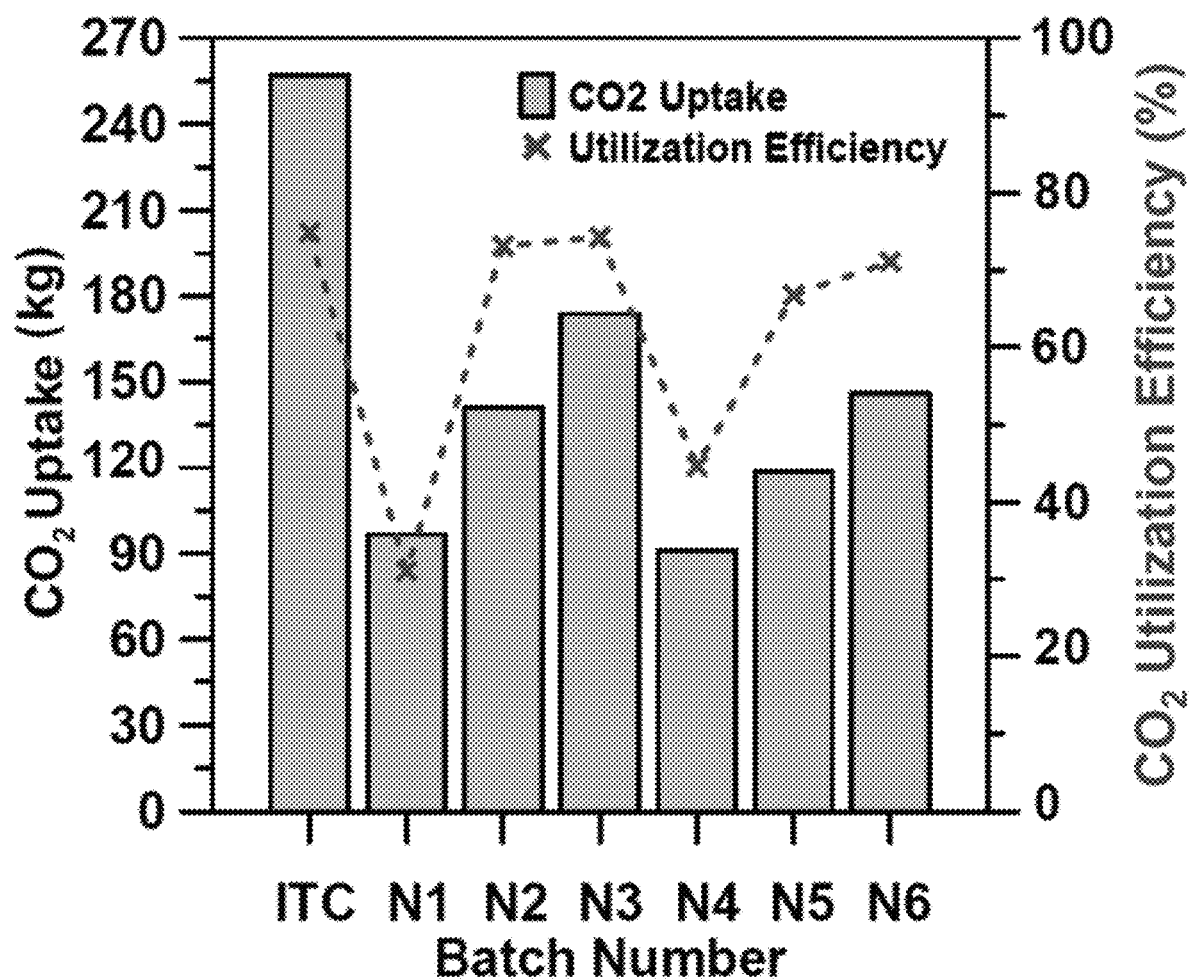
FIG. 3B is a plot of batch-wise trends for the $CO_2$ uptake and $CO_2$ utilization efficiency of producing concrete blocks at a second facility using both coal and natural gas fired flue gas streams.

FIG. 3B shows the batch-wise trends for $CO_2$ uptake and $CO_2$ utilization efficiency of produced concrete masonry blocks at a second facility from the $CO_2$ mineralization process discussed above. In FIG. 3B, the ITC batch represents the first facility with an average $CO_2$ concentration of about 12% (v/v). Batches N1, N2, N3, and N6 used coal flue gas with an average $CO_2$ concentration of about 12% (v/v). Batches N4 and N5 used natural gas flue gas with an average $CO_2$ concentration of about 4% (v/v). As shown, batches N4 and N5 demonstrate a lower $CO_2$ uptake and a lower $CO_2$ utilization efficiency in comparison to most of the other batches, with the exception of batch N1. A similar $CO_2$ utilization efficiency was achieved in the second facility as was achieved in the first facility. Further, both facilities demonstrated fulfilled performance metrics using a "direct $CO_2$ utilization" process without any carbon capture and clean-up steps at ambient pressure which confirms the viability of the $CO_2$ mineralization process disclosed above using very dilute $CO_2$ streams such as natural gas flue gas streams.

Concrete blocks were composed of cement, fly ash, portlandite and aggregates. Portlandite was the primary reactant in concrete block to absorb $CO_2$. Batches N1, N2, N3, and N6 used coal flue gas with an average $CO_2$ concentration of about 12% (v/v). Batches N4 and N5 used natural gas flue gas with an average $CO_2$ concentration of about 4% (v/v).

Example 3

Figure 4:
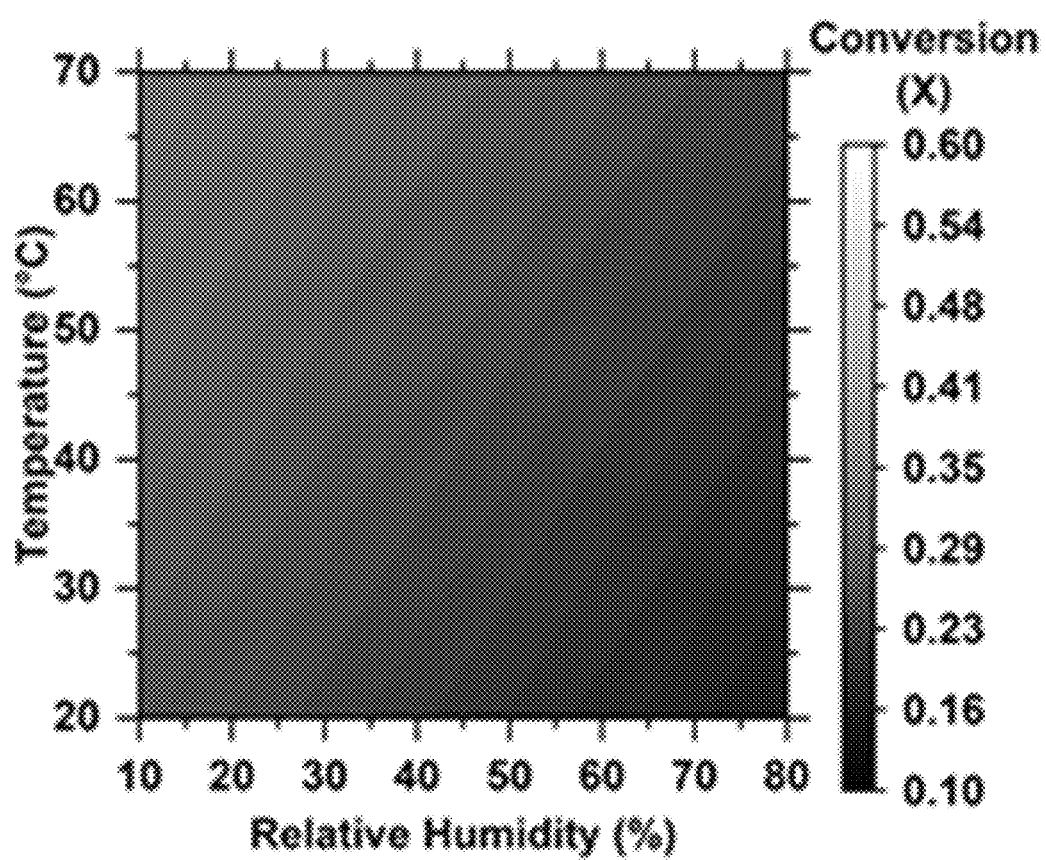
FIG. 4 shows the effect of T and RH on the X (conversion) at 4 v./v. % using the developed regression model for the solid phase conversion.
Figure 5:
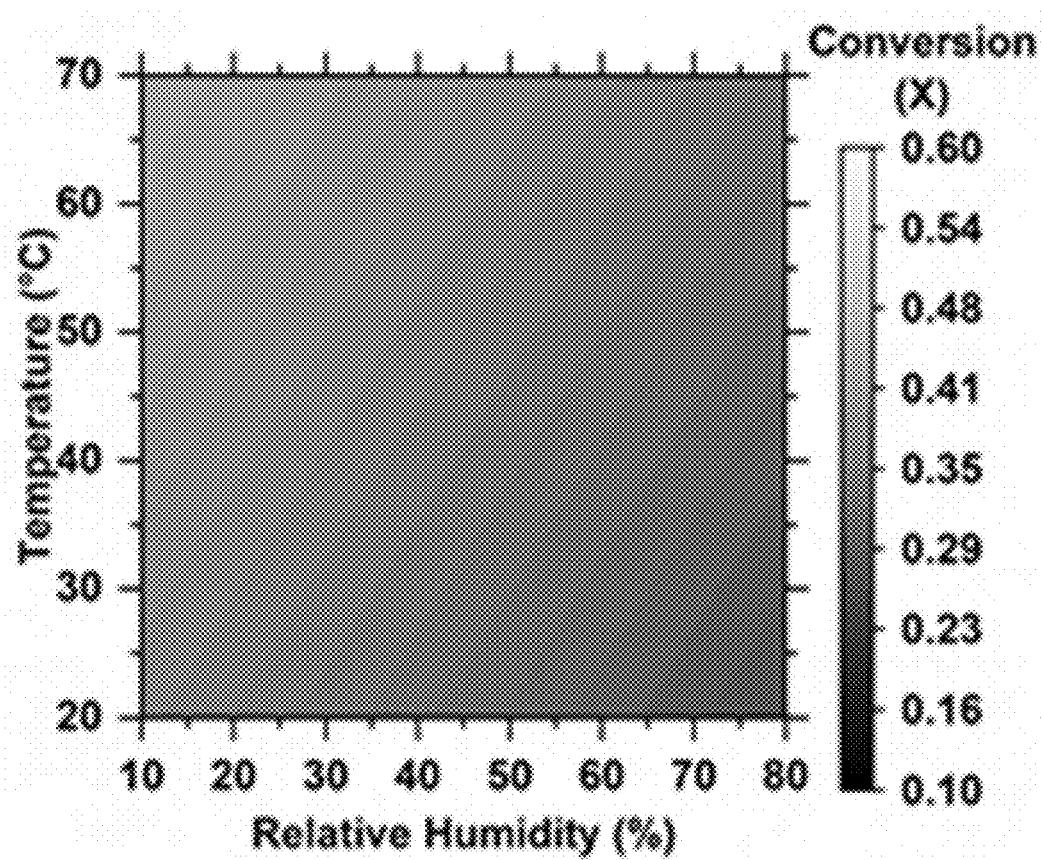
FIG. 5 shows the effect of T and RH on the X (conversion) at 9 v./v. % using the developed regression model for the solid phase conversion.

A model was developed to calculate the conversion of the solid phase ($Ca(OH)_2$ to $CaCO_3$) after 24 hours of carbonation. $Ca(OH)_2$ is an equivalent material for modeling concrete formation. The relationship between processing conditions ([$CO_2$] concentration, Relative Humidity, Temperature) is shown in FIG. 4, for [$CO_2$]=4% v/v; and FIG. 5, for [$CO_2$]=9% v/v. The results show the improved conversion of the solid material and therefore greater $CO_2$ uptake by increasing the $CO_2$ concentration in the reactor. The model is valid for 2-to-16% v/v $CO_2$.

A parametric approach was followed to systematically evaluate the influence of processing conditions on the conversion of the solid phase of the dry-cast concrete from available $Ca(OH)_2$ to $CaCO_3$. An experimental matrix covering a combination of operating conditions within the ranges of 20° C.<temperature<65° C., 10%<relative humidity<80% and 4%<$CO_2$<14% (v/v) was developed to produce a model. The model determines the total conversion to $CaCO_3$ based on the operating conditions. The maximum theoretical $CaCO_3$ formation was calculated based on the mixture design of the concrete and the stoichiometric maximum $CaCO_3$.

Figure 8:
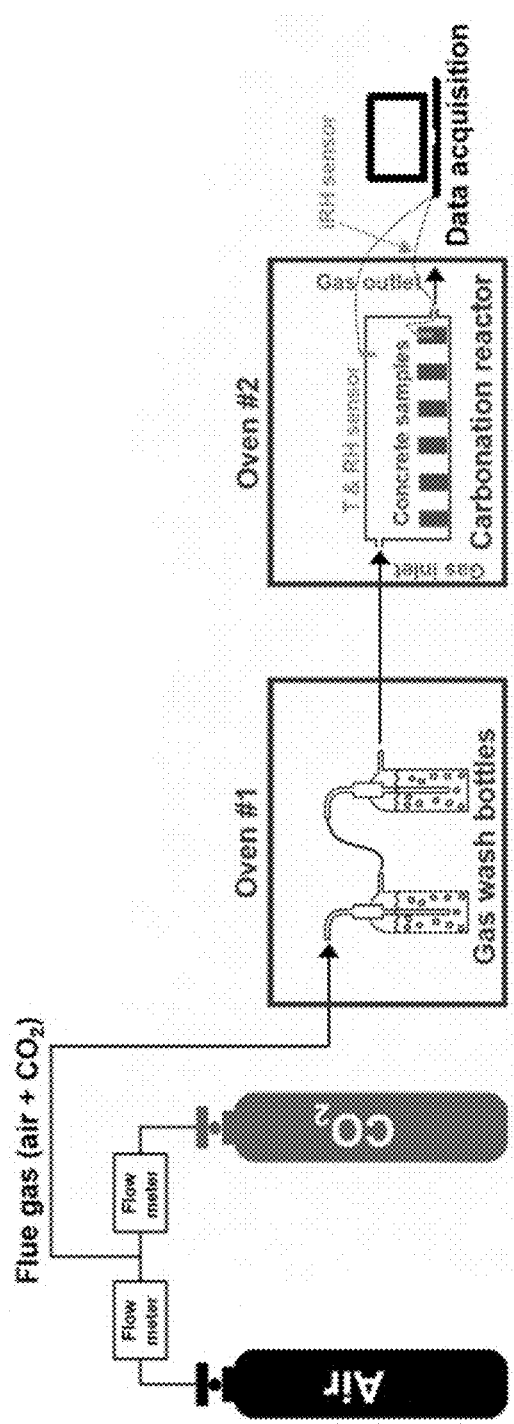
FIG. 8 shows an apparatus for mixing compressed air and $CO_2$ to achieve specific $CO_2$ concentrations at specific relative humidities and specific temperatures.

Dry-cast concrete was mixed at a low water to cement (w/c) ratio (i.e., zero slump) then consolidated by mechanical compaction. The concrete mixture was placed in a metal mold and a 15 MPa compaction stress was applied at a loading rate of 0.9 kN/s followed by holding the stress for 15 seconds before removing the compaction stress. After that, the compacted concrete sample was removed from the mold to undergo curing. USP grade $CO_2$ (purity>99.5%) and compressed air were mixed and regulated using mass flow controllers to achieve a specific $CO_2$ concentration in the gas stream for the bench-scale carbonation reactor. The relative humidity was controlled by bubbling the gas through two wash bottles placed in series (within oven #1) as shown in FIG. 8. The temperature of oven #1 was adjusted to reach the desired gas relative humidity. The humidified flue gas was then streamed to a reactor that contained the concrete samples and placed in oven #2 to control the temperature.

To quantify the carbonation in the concrete, a powder was extracted from the concrete at 24 hours of carbonation. The powder collected was analyzed by thermogravimetric analysis (TGA) using an STA 6000 (Perkin Elmer). A temperature range of 35 to 950° C. using a heating rate of 15° C./min with ultra-high purity N2 gas (purity>99.99%) purge at a 20 mL/min flow rate was used. The $CO_2$ content (mass % of total solids) in the sample was quantified by using the following equation to calculate the difference in the residual mass at a temperature range between 600 to 900° C. at which mineral carbonates (such as $CaCO_3$) decompose. See, as background, S. Maheswaran, A. Ramachandra Murthy, V. Ramesh Kumar, A. Karunanithi, Characterisation studies on the particle size effect of calcium carbonate in high-strength concrete, Magazine of Concrete Research. 73 (2021) 661-673. https://doi.org/10.1680/jmacr.19.00375; N. Vogler, P. Drabetzki, M. Lindemann, H.-C. Kane, Description of the concrete carbonation process with adjusted depth-resolved thermogravimetric analysis, J Therm Anal calorim. 147 (2022) 6167-6180. https://doi.org/10.1007/s10973-021-10966-1:

$$m_{CO2} = \frac{m_{(600-900° C.)}}{m_{solid}} \times 100 \qquad \text{Eq. 3}$$

where $m_{CO2}$ is the mass percentage of $CO_2$ determined from TGA (mass %), $m_{(600-900° C.)}$ is the mass loss between 600 to 900° C. (mg), and $m_{solid}$ is the mass of the solid sample (mg). The initial content of $CO_2$ in the pre-carbonated samples was subtracted from the post-carbonation samples to account for $CO_2$ that was formed during the carbonation process. The total $CaCO_3$ formed from the carbonation process was divided by the maximum possible $CaCO_3$ formation to determine the total conversion of the solid material.

Example 4

The Example shows that early age carbonation curing results in an increase in volume of reaction products by about 10% which reduces the porosity and enhances the mechanical properties and durability of the concrete.

Figure 6:
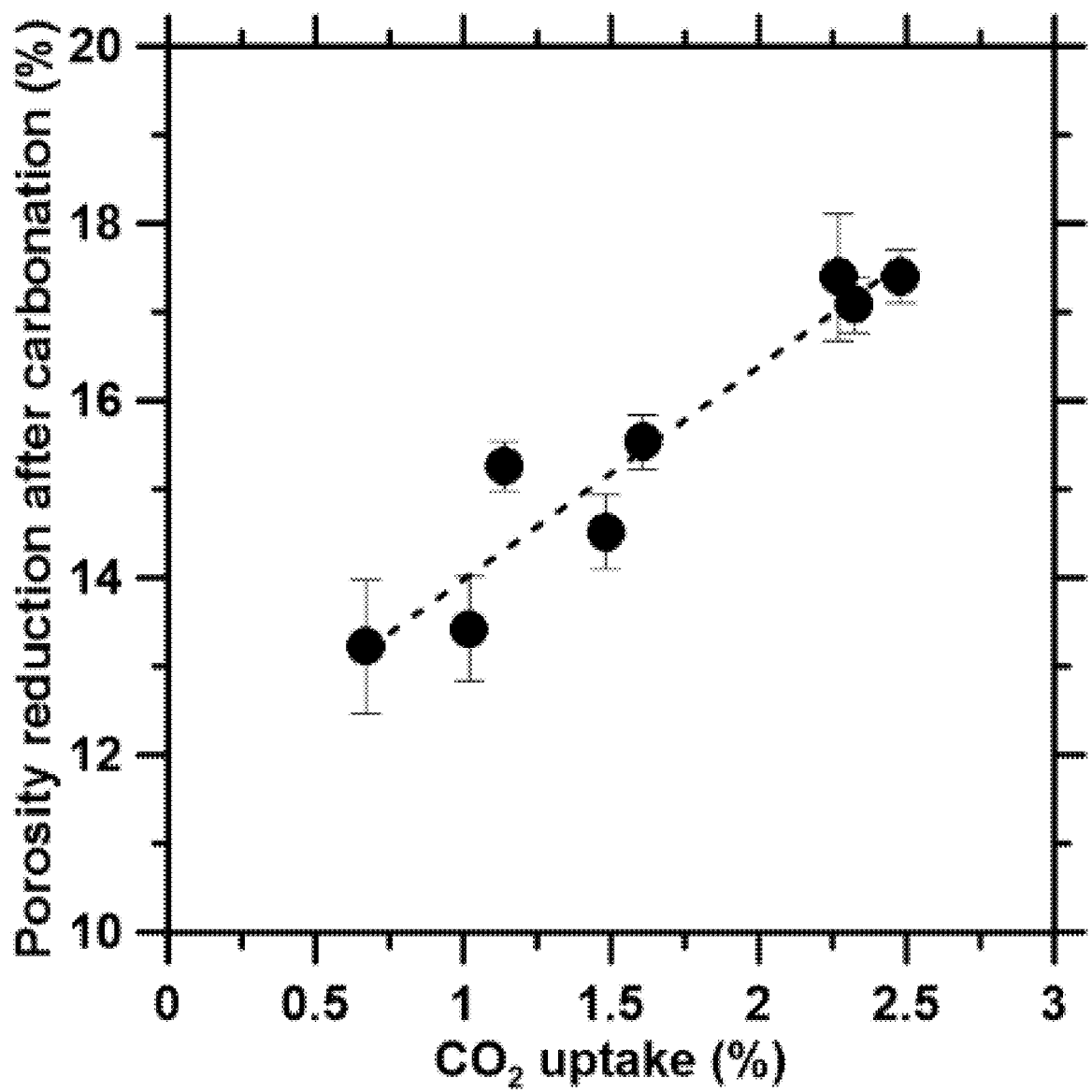
FIG. 6 shows porosity reduction of carbonated concrete compared to non-carbonated as a function of $CO_2$ uptake.
Figure 7:
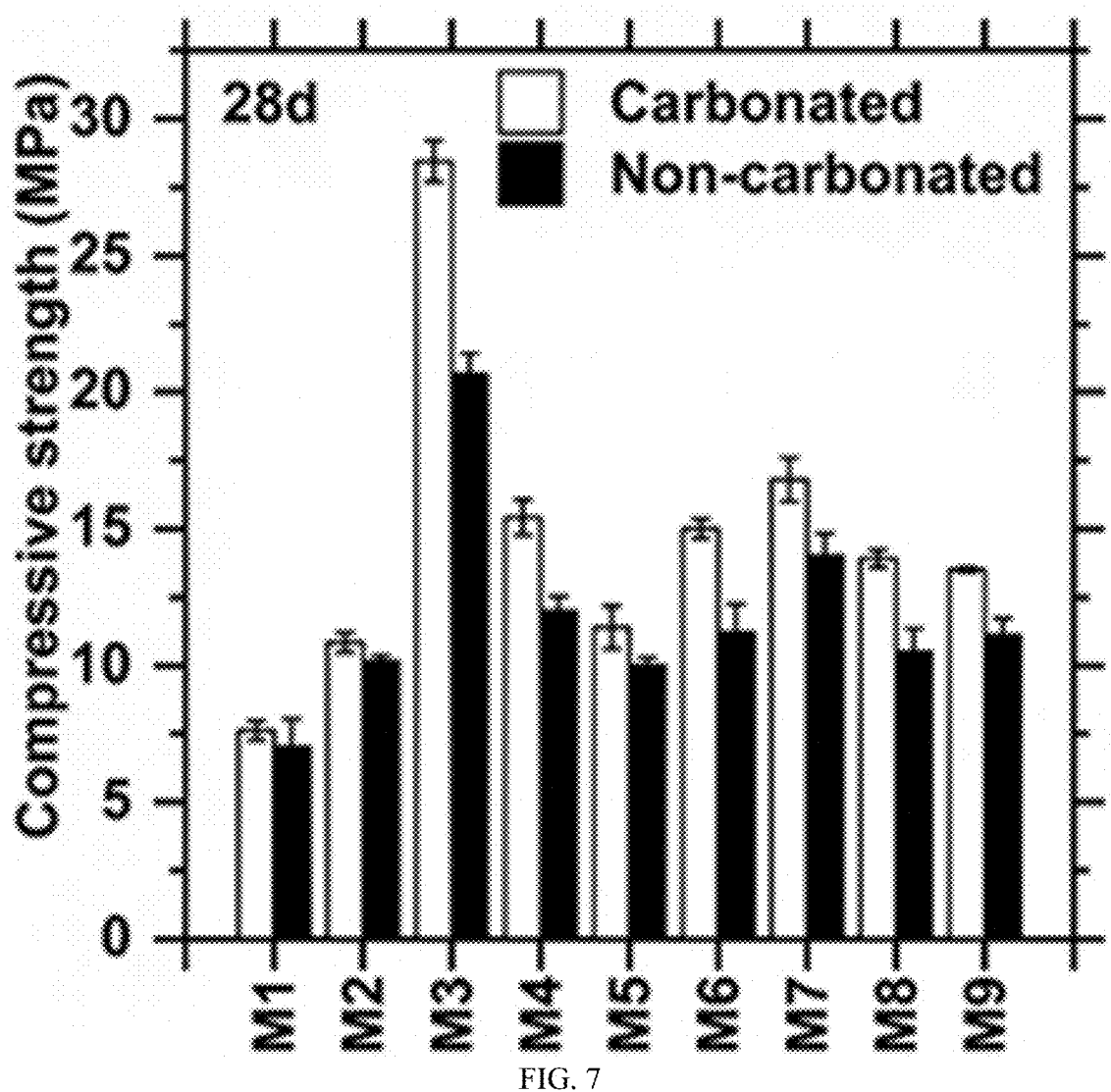
FIG. 7 shows strength of nine concrete mixtures at 28 days comparing the carbonated and non-carbonated samples.

Porosity reduction of carbonated versus non-carbonated concrete samples dependent on $CO_2$ uptake is shown in FIG. 6. There is clear increased volume reduction with increased $CO_2$ uptake by at least 13.2%. The samples tested had varied mixture designs of portlandite, class C fly ash and Portland cement. The samples were carbonated at 50° C., 14 v/v % $CO_2$ and 10% RH for 24 hours. The samples included portlandite, cement, fly ash and aggregates. The strength improvements from carbonation increased from 6.8-to-37.9% depending on the mixture design. See FIG. 7.

Example 5

Rate constants of portlandite carbonation as particulates as a function of $CO_2$ concentration after 24 hours of carbonation are shown below in Table 1. See, for example, G. Falzone, I. Mehdipour, N. Neithalath, M. Bauchy, D. Simonetti, G. Sant, New insights into the mechanisms of carbon dioxide mineralization by portlandite, AIChE J. 67 (2021). https://doi.org/10.1002/aic.17160), which is incorporated by reference in its entirety for all purposes.

Rate constants of portlandite carbonation within concrete mixtures as a function of $CO_2$ concentration after 24 hours of carbonation are shown below in Table 2.

Tables 1 and 2 shows the apparent rate constant in terms of the conversion of solid material. Tables 1 and 2 show the benefit of a high relative humidity (80%) for $CO_2$ concentrations of 2% or greater including 2%, 5%, 12%, 25%, and 65% v/v.

The data in this Example is for portlandite particles. Unlike concrete, higher RH results in a greater carbonation rate constant for particles. See FIG. 1(a) in Falzone, Gabriel, Iman Mehdipour, Narayanan Neithalath, Mathieu Bauchy, Dante Simonetti, and Gaurav Sant. "New insights into the mechanisms of carbon dioxide mineralization by portlandite." AIChE Journal 67, no. 5 (2021): e17160; doi.org/10.1002/aic.17160, the entire contents of which are herein incorporated by reference in its entirety for all purposes, which demonstrates this.

Conversion of the portlandite particles and concrete at time t (s), was calculated using Eq. 2:

$$X(t) = Xf \frac{kt}{Xf + kt} \quad \text{Eq. 2}$$

Where X(t) is the conversion at time t, Xf is the final conversion for given operating conditions, t is time (s) and k is the rate constant ($s^{-1}$).

TABLE 1

Carbonation rate constants for portlandite particles as a function of $CO_2$ concentration for reactor conditions at 65° C. and 80% RH

| $CO_2$ concentration (v/v %) | Apparent rate constant ($s^{-1}$) |
|---|---|
| 0.04 | 1.31E–06 |
| 2 | 1.37E–04 |
| 5 | 1.57E–04 |
| 12 | 2.49E–04 |
| 25 | 3.13E–04 |
| 65 | 3.00E–04 |

TABLE 2

Carbonation rate constants for portlandite within concrete mixtures at 65° C. and 10% RH.

| $CO_2$ concentration (v/v %) | Apparent rate constant ($s^{-1}$) |
|---|---|
| 4 | 5.98E–05 |
| 9 | 7.65E–05 |
| 14 | 9.00E–05 |

The following references may be relevant for background purposes. 1. Keith, D. W.; Holmes, G.; St. Angelo, D.; Heidel, K. A Process for Capturing $CO_2$ from the Atmosphere. Joule 2018, 2 (8), 1573-1594. 2. Keith, D. W.; Ha-Duong, M.; Stolaroff, J. K. Climate Strategy with $CO_2$ Capture from the Air. Clim. Change 2006, 74 (1), 17-45. 3. Sakwattanapong, R.; Aroonwilas, A.; Veawab, A., Behavior of Reboiler Heat Duty for $CO_2$ Capture Plants Using Regenerable Single and Blended Alkanolamines. Ind. Eng. Chem. Res. 2005, 44, 4465-4473. 4. Feng, B.; Du, M.; Dennis, T. J.; Anthony, K.; Perumal, M. J., Reduction of Energy Requirement of CO2 Desorption by Adding Acid into $CO_2$-Loaded Solvent. Energy & Fuels 2010, 24 (1), 213-219. 5. Dutcher, B.; Fan, M.; Russell, A. G., Amine-Based $CO_2$ Capture Technology Development from the Beginning of 2013—A Review. ACS Appl. Mater. Interfaces 2015, (7), 2137-2148. 6. MacDowell, N.; Florin, N.; Buchard, A.; Hallett, J.; Galindo, A.; Jackson, G.; Adjiman, C. S.; Williams, C. K.; Shah, N.; Fennell, P., An Overview of $CO_2$ Capture Technologies. Energy Environ. Sci. 2010, 3, 1645-1669.

Other embodiments are set forth in the following claims.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure. It should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto.

What is claimed is:

1. A method of forming a concrete product, the method comprising:
   capturing $CO_2$ from a gas source, the capturing comprising:
      contacting the gas source with an absorption solution having a solvent and a solute, wherein the solvent and/or the solute are capable of reacting with $CO_2$ to form an anionic compound;
      adjusting the pH of the absorption solution electrochemically to less than about 7 to release the $CO_2$ as a concentrated vapor containing $CO_2$;
      collecting the concentrated vapor containing $CO_2$;
      regenerating the solvent and/or the solute; and
   flowing the concentrated vapor containing $CO_2$ through a gas processing unit to adjust at least one of a temperature, a relative humidity, or a flow rate of the concentrated vapor containing $CO_2$; and
   contacting the concentrated vapor containing $CO_2$ with a concrete component.

2. The method of claim 1, wherein the concentrated vapor comprises about 2-99% (v/v) $CO_2$.

3. The method of claim 1, wherein the concentrated vapor comprises greater than or equal to 2% (v/v) $CO_2$.

4. The method of claim 1, wherein the concentrated vapor comprises less than or equal to 5% (v/v) $CO_2$.

5. The method of claim 1, wherein the concentrated vapor comprises 2.0% to 5.0% (v/v) $CO_2$.

6. The method of claim 1, wherein the concentrated vapor comprises 2.0, 2.5, 3.0, 3.5, 4.0, 4.5, or 5.0% (v/v) $CO_2$.

7. The method of claim 1, wherein the concentrated vapor containing $CO_2$ has a relative humidity that ranges from 5% to 90%.

8. The method of claim 1, wherein the concentrated vapor containing $CO_2$ has a temperature that ranges from 20° C. to 80° C.

9. The method of claim 1, wherein collecting the concentrated vapor containing $CO_2$ comprises fractionally enriching the concentration of $CO_2$ in the concentrated vapor containing $CO_2$.

10. The method of claim 1, wherein the absorption solution comprises one or more amines.

11. The method of claim 1, wherein contacting the concentrated vapor containing $CO_2$ with the concrete component further comprises:
    providing a carbonatable concrete mixture comprising the concrete component;
    hydrating the carbonatable concrete mixture, reacting the carbonatable concrete mixture, or both hydrating and reacting the carbonatable concrete mixture to form the concrete component; and
    contacting the concrete component with the concentrated vapor containing $CO_2$ to harden the concrete mixture via the formation of carbonate minerals to form a concrete product.

12. The method of claim 1, wherein the gas source is an effluent from an industrial source, an atmospheric source, a commercially-available $CO_2$ source, or liquefied $CO_2$.

13. The method of claim 1, wherein adjusting the pH of the absorption solution occurs at ambient temperature.

14. The method of claim 1, wherein the concentrated vapor containing $CO_2$ is not stored.

15. The method of claim 1, wherein adjusting the pH of the absorption solution electrochemically to less than about 7 to release the $CO_2$ as a concentrated vapor containing $CO_2$ comprises using a pH swing induced by water electrolysis in a cell that incorporates at least one ion exchange membrane.

16. The method of claim 1, further comprising collecting the regenerated solvent and/or solute.

* * * * *